(12) United States Patent
Kahu et al.

(10) Patent No.: US 12,388,991 B2
(45) Date of Patent: Aug. 12, 2025

(54) FEATURE BASED CROSS-COMPONENT SAMPLE OFFSET OPTIMIZATION AND SIGNALING IMPROVEMENT

(71) Applicant: Tencent America LLC, Palo Alto, CA (US)

(72) Inventors: Samruddhi Yashwant Kahu, Laguna Hills, CA (US); Xin Zhao, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 22 days.

(21) Appl. No.: 18/367,982

(22) Filed: Sep. 13, 2023

(65) Prior Publication Data

US 2024/0291976 A1 Aug. 29, 2024

Related U.S. Application Data

(60) Provisional application No. 63/448,617, filed on Feb. 27, 2023.

(51) Int. Cl.
*H04N 19/00* (2014.01)
*H04N 19/11* (2014.01)
(Continued)

(52) U.S. Cl.
CPC ........... *H04N 19/117* (2014.11); *H04N 19/11* (2014.11); *H04N 19/124* (2014.11); *H04N 19/13* (2014.11);
(Continued)

(58) Field of Classification Search
CPC .... H04N 19/117; H04N 19/11; H04N 19/124; H04N 19/13; H04N 19/132; H04N 19/14;
(Continued)

(56) References Cited

U.S. PATENT DOCUMENTS 11,595,644 B2  2/2023  Du et al.
11,683,530 B2  6/2023  Du et al.
(Continued)

FOREIGN PATENT DOCUMENTS

CN      104702963 B      11/2017
WO      2015163046 A1    10/2015
(Continued)

OTHER PUBLICATIONS

Chen et al., An Overview of Core Coding Tools in the AV1 Video Codec, 2018 Picture Coding Symposium (PCS), San Francisco, CA, USA, 2018, pp. 41-45.
(Continued)

*Primary Examiner* — Zhihan Zhou
(74) *Attorney, Agent, or Firm* — ArentFox Schiff LLP

(57) ABSTRACT

In some examples, an apparatus for video decoding includes receiving circuitry and processing circuitry. The processing circuitry receives, from a coded video bitstream, coded information associated with one or more blocks in a current picture, the coded information indicates that a cross-component sample offset (CCSO) filter is used for decoding the one or more blocks. The processing circuitry determines one or more features associated with the one or more blocks, the one or more features is used as a context for signaling a value associated with the CCSO filter. The processing circuitry determines at least a signaled value associated with the CCSO filter based on a context model, the context model using the one or more features as a context, and reconstructs samples in the one or more blocks based on at least the signaled value associated with the CCSO filter.

20 Claims, 13 Drawing Sheets

(51) Int. Cl.
| | |
|---|---|
| *H04N 19/117* | (2014.01) |
| *H04N 19/124* | (2014.01) |
| *H04N 19/13* | (2014.01) |
| *H04N 19/132* | (2014.01) |
| *H04N 19/14* | (2014.01) |
| *H04N 19/172* | (2014.01) |
| *H04N 19/176* | (2014.01) |
| *H04N 19/182* | (2014.01) |
| *H04N 19/70* | (2014.01) |
| *H04N 19/80* | (2014.01) |

(52) U.S. Cl.
CPC ........... *H04N 19/132* (2014.11); *H04N 19/14* (2014.11); *H04N 19/172* (2014.11); *H04N 19/176* (2014.11); *H04N 19/182* (2014.11); *H04N 19/70* (2014.11); *H04N 19/80* (2014.11)

(58) Field of Classification Search
CPC .. H04N 19/172; H04N 19/176; H04N 19/182; H04N 19/70; H04N 19/80
See application file for complete search history.

(56) References Cited

U.S. PATENT DOCUMENTS

| | | | | |
|---|---|---|---|---|
| 2011/0200101 | A1* | 8/2011 | Zan | H04N 19/194 375/240.03 |
| 2013/0336383 | A1 | 12/2013 | Xu et al. | |
| 2017/0127078 | A1 | 5/2017 | Kobayashi | |
| 2018/0352225 | A1* | 12/2018 | Guo | H04N 19/186 |
| 2019/0045186 | A1 | 2/2019 | Zhang et al. | |
| 2019/0052877 | A1 | 2/2019 | Zhang et al. | |
| 2019/0182482 | A1 | 6/2019 | Vanam et al. | |
| 2021/0051320 | A1 | 2/2021 | Tourapis et al. | |
| 2022/0101095 | A1 | 3/2022 | Li et al. | |
| 2022/0109832 | A1* | 4/2022 | Du | H04N 19/132 |
| 2022/0109848 | A1 | 4/2022 | Wang | |
| 2022/0109853 | A1* | 4/2022 | Zhang | H04N 19/117 |
| 2022/0248007 | A1 | 8/2022 | Misra et al. | |
| 2022/0272335 | A1 | 8/2022 | Liu et al. | |
| 2022/0272347 | A1 | 8/2022 | Zhu et al. | |
| 2022/0272348 | A1 | 8/2022 | Zhang et al. | |
| 2022/0279176 | A1 | 9/2022 | Sarwer et al. | |
| 2022/0286674 | A1 | 9/2022 | Wang et al. | |
| 2022/0295054 | A1 | 9/2022 | Zhao et al. | |
| 2022/0303586 | A1 | 9/2022 | Du et al. | |
| 2022/0321919 | A1 | 10/2022 | Deshpande | |
| 2022/0337853 | A1 | 10/2022 | Li et al. | |

FOREIGN PATENT DOCUMENTS

| | | |
|---|---|---|
| WO | 2020259538 A1 | 12/2020 |
| WO | 2022040428 A1 | 2/2022 |

OTHER PUBLICATIONS

Rivaz et al., AV1 Bitstream & Decoding Process Specification the Alliance for Open Media 681, Jan. 8, 2019, pp. 1-681.
D. Mukherjee, S. Li, Y. Chen, A. Anis, S. Parker, and J. Bankoski. "A switchable loop-restoration with side-information framework for the emerging AV1 video codec." In 2017 IEEE International Conference on Image Processing (ICIP), pp. 265-269. IEEE, 2017.
S. Midtskogen, A. Fuldseth, G. Bj, and T. Davies. "Integrating Thor tools into the emerging AV1 codec." In 2017 IEEE International Conference on Image Processing (ICIP), pp. 930-933. IEEE, 2017.
S. Midtskogen, and J.-M. Valin. "The AV1 constrained directional enhancement filter (CDEF)." In 2018 IEEE International Conference on Acoustics, Speech and Signal Processing (ICASSP), pp. 1193-1197. IEEE, 2018.
Daede, Thomas J., Nathan E. Egge, Jean-Marc Valin, Guillaume Martres, and Timothy B. Terriberry. "Daala: A perceptually-driven next generation video codec." arXiv preprint arXiv:1603.03129 (2016).
X. Zhao, Y. Du, Y. Zheng, et al., "Improved CCSO with luma extension and band feature." CWG-B099, Jan. 2022, pp. 1-5.
Y. Du, X. Zhao and S. Liu, "Cross-component sample offset for image and video coding." In 2021 IEEE International Conference on Visual Communication and Image Processing (VCIP), IEEE, 2021, pp. 1-5.
C. Tsai, C. Fu, C. Chen, Y. Huang, S. Lei, "TE10 Subtest2: Coding Unit Synchronous Picture Quadtree-based Adaptive Loop Filter", ITU-T SG16 WP3 and ISO/IEC JTC1/SC29/WG11 JCTVC-C143, Oct. 2010, pp. 1-12.
J. Taquet, P. Onno, C. Gisquet, G. Laroche, "CE5: Results of tests CE5-3.1, CE5-3.2, CE5-3.3 and CE5-3.4 on Non-Linear Adaptive Loop Filter.", ISO/IEC JTC1/SC29/WVG11 JVET-N0242-v2, Mar. 2019, pp. 1-10.
K. Misra, F. Bossen, A. Segall, "Cross-Component Adaptive Loop Filter for chroma", ISO/IEC JTC1/SC29/WG11 JVET O-0636-r1, Jul. 2019, pp. 1-9.
K. Misra, F. Bossen, A. Segall, ect, "CE5-related: On the design of CC-ALF", ISO/IEC JTC1/SC29/WG11 JVET-P1008-v2, Oct. 2019, pp. 1-6.
B. Bross, J. Chen, S. Liu, Y. K. Wang, "Versatile Video Coding (Draft 8)", ISO/IEC JTC1/SC29/WG11 JVET-Q2001, Jan. 2020, pp. 1-510.
International Search Report mailed May 3, 2022 for International Application No. PCT/US2022/014255.
Written Opinion mailed May 3, 2022 for International Application No. PCT/US2022/014255.
Bross, B. et al.; "Versatile Video Coding (Draft 6)"; Document: JVET-O2001-vE; Joint Video Experts Team (JVET) of ITU-T SG 16 WP 3 and ISO/IEC JTC 1/SC 29/WG11, 15th Meeting: Gothenburg, SE, Jul. 3-12, 2019; 455 pages.
Bross, B et al.; "Versatile Video Coding (Draft 7)"; Document: JVET-P2001-vE; Joint Video Experts Team (JVET) of ITU-T SG 16 WP 3 and ISO/IEC JTC 1/SC 29/WG 11, 16th Meeting: Geneva, CH, Oct. 1-11, 2019; 485 pages.
Office Action issued on European Application 22760638.1 on Jun. 9, 2023, 16p.
Bross, Benjamin et al., "Working Draft 5 of Versatile Video Coding", JVET, International Organization for Standardization, ISO/IEC JTC 1/SC29/WG11 N18370, Coding of Moving Pictures and Audio, Mar. 2019, 406p, CH.
Bhat, Madhukar et al., "AHG10: Adaptive Coding Sub-set for encoder optimization", Input Document to JVET of ITU-T SG 16 WP 3 and ISO/IEC JTC 1/SC 29/WG 11, 15th Meeting, Jul. 3-12, 2019, 7p, SE.
International Search Report with Written Opinion mailed Dec. 12, 2023 for International Application No. PCT/US2023/074464.

\* cited by examiner

| | |
|---|---|
|    if ( slice_cross_component_alf_cb_enabled_flag ) | |
|      alf_ctb_cross_component_cb_idc[ xCtb >> CtbLog2SizeY ][ yCtb >> CtbLog2SizeY ] | ae(v) |
|    if( slice_cross_component_alf_cb_enabled_flag = = 0 \|\| alf_ctb_cross_component_cb_idc[ xCtb >> CtbLog2SizeY ][ yCtb >> CtbLog2SizeY ] = = 0 ) | |
|      if( slice_alf_chroma_idc = = 1 \|\| slice_alf_chroma_idc = = 3 ) { | |
|         alf_ctb_flag[ 1 ][ xCtb >> CtbLog2SizeY ][ yCtb >> CtbLog2SizeY ] | ae(v) |
|         if( alf_ctb_flag[ 1 ][ xCtb >> CtbLog2SizeY ][ yCtb >> CtbLog2SizeY ]       && aps_alf_chroma_num_alt_filters_minus1 > 0 ) | |
|         alf_ctb_filter_alt_idx[ 0 ][ xCtb >> CtbLog2SizeY ][ yCtb >> CtbLog2SizeY ] | ae(v) |
|      } | |
|    if ( slice_cross_component_alf_cr_enabled_flag ) | |
|      alf_ctb_cross_component_cr_idc[ xCtb >> CtbLog2SizeY ][ yCtb >> CtbLog2SizeY ] | ae(v) |
|    if( slice_cross_component_alf_cr_enabled_flag = = 0 \|\| alf_ctb_cross_component_cr_idc[ xCtb >> CtbLog2SizeY ][ yCtb >> CtbLog2SizeY ] = = 0 ) | |
|      if( slice_alf_chroma_idc = = 2 \|\| slice_alf_chroma_idc = = 3 ) { | |
|         alf_ctb_flag[ 2 ][ xCtb >> CtbLog2SizeY ][ yCtb >> CtbLog2SizeY ] | ae(v) |
|         if( alf_ctb_flag[ 2 ][ xCtb >> CtbLog2SizeY ][ yCtb >> CtbLog2SizeY ]       && aps_alf_chroma_num_alt_filters_minus1 > 0 ) | |
|         alf_ctb_filter_alt_idx[ 1 ][ xCtb >> CtbLog2SizeY ][ yCtb >> CtbLog2SizeY ] | ae(v) |
|      } | |

FIG. 8

| SAO Type | Sample Adaptive Offset Type to be used | Number of categories |
|---|---|---|
| 0 | None | 0 |
| 1 | 1-D 0-degree pattern (edge offset) | 4 |
| 2 | 1-D 90-degree pattern (edge offset) | 4 |
| 3 | 1-D 135-degree pattern (edge offset) | 4 |
| 4 | 1-D 45-degree pattern (edge offset) | 4 |
| 5 | central bands (band offset) | 16 |
| 6 | side bands (band offset) | 16 |

| Category | Condition |
|---|---|
| 1 | c < 2 neighbors |
| 2 | c < 1 neighbor && c == 1 neighbor |
| 3 | c > 1 neighbor && c == 1 neighbor |
| 4 | c > 2 neighbors |
| 0 | None of the above |

| Combination | d0 | d1 | Offset |
|---|---|---|---|
| 0 | -1 | -1 | s0 |
| 1 | -1 | 0 | s1 |
| 2 | -1 | 1 | s2 |
| 3 | 0 | -1 | s3 |
| 4 | 0 | 0 | s4 |
| 5 | 0 | 1 | s5 |
| 6 | 1 | -1 | s6 |
| 7 | 1 | 0 | s7 |
| 8 | 1 | 1 | s8 |

| Probability State | LPS Range | | | |
|---|---|---|---|---|
| | Segment 0 | Segment 1 | Segment 2 | Segment 3 |
| ... | | | | |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | | | | |

FEATURE BASED CROSS-COMPONENT SAMPLE OFFSET OPTIMIZATION AND SIGNALING IMPROVEMENT

INCORPORATION BY REFERENCE

The present application claims the benefit of priority to U.S. Provisional Application No. 63/448,617, "Feature based Cross-Component Sample Offset Optimization and Signaling Improvement" filed on Feb. 27, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives, from a coded video bitstream, coded information associated with one or more blocks in a current picture, the coded information indicates that a cross-component sample offset (CCSO) filter is used for decoding the one or more blocks, the CCSO filter is associated with a plurality of CCSO filter parameters. The processing circuitry determines one or more features associated with the one or more blocks, the one or more features is used as a context for signaling a value associated with the CCSO filter. The processing circuitry determines at least a signaled value associated with the CCSO filter based on a context model, the context model using the one or more features as a context, and reconstructs samples in the one or more blocks based on at least the signaled value associated with the CCSO filter.

In some examples, the context for signaling the value associated with the CCSO filter comprises at least one of whether a specific CCSO filter parameter is signaled, and/or the context used for entropy coding the specific CCSO filter parameter.

In some examples, the one or more features is indicative of texture information in the one or more blocks, the one or more features comprises at least one of an edge direction for one or more edges in the one or more blocks, a range of pixel values in the one or more blocks, a histogram of pixel values in the one or more blocks, and gradient information of pixels in the one or more blocks.

In some examples, the processing circuitry determines the context model based on the one or more features, the context model includes an assignment of at least a first probability value to a first candidate value of a filter parameter for the CCSO filter and a second probability value to a second candidate value of the filter parameter for the CCSO filter, the first probability value is higher than the second probability value when the first candidate value is associated with the one or more features.

In some examples, the processing circuitry determines, based on the context model, that a specific filter parameter for the CCSO filter is not signaled.

In some examples, the one or more features includes an edge direction, the signaled value is indicative of a filter shape, and in response to the edge direction being vertical, the processing circuitry determines the context model that comprises a highest probability assigned to a vertical filter shape. In another example, in response to the edge direction being horizontal, the processing circuitry determines the context model that comprises a highest probability assigned to a horizontal filter shape. In another example, in response to the edge direction being diagonal, the processing circuitry determines the context model that comprises a highest probability assigned to a diagonal filter shape.

In some examples, the one or more features comprise a range of pixel values in the one or more blocks, and the context model comprises an assignment of probability values to candidate band numbers.

In some examples, the one or more features comprise a range of pixel values in the one or more blocks, and the context model comprises an assignment of probability values to candidate quantization steps.

In some examples, the processing circuitry determines the signaled value indicative of an on/off decision for the CCSO filter based on the context model that uses the one or more features as the context. In an example, the on/off decision is of at least one of a frame level, a tile level, and a block level. In another example, the one or more features is indicative a flatness, and the context model comprises an assignment of a higher probability value to a first candidate value of an off decision for the CCSO filter than to a second candidate value of an on decision for the CCSO filter. In another example, the one or more blocks comprises a current block and a neighboring block of the current block, and the context model uses a flatness of the neighboring block as context.

In some examples, the one or more features comprise at least one of a first coded syntax value indicative of whether a skip mode being applied, a second coded syntax value indicative of whether intra or inter prediction mode being applied, a third coded syntax value indicative of whether residuals being zero or not, a fourth coded syntax value indicative of an intra prediction mode direction, and a fifth coded syntax value indicative of a coding block partitioning size.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 8 shows a syntax example according to some embodiments of the disclosure.

DETAILED DESCRIPTION OF EMBODIMENTS

Figure 1:
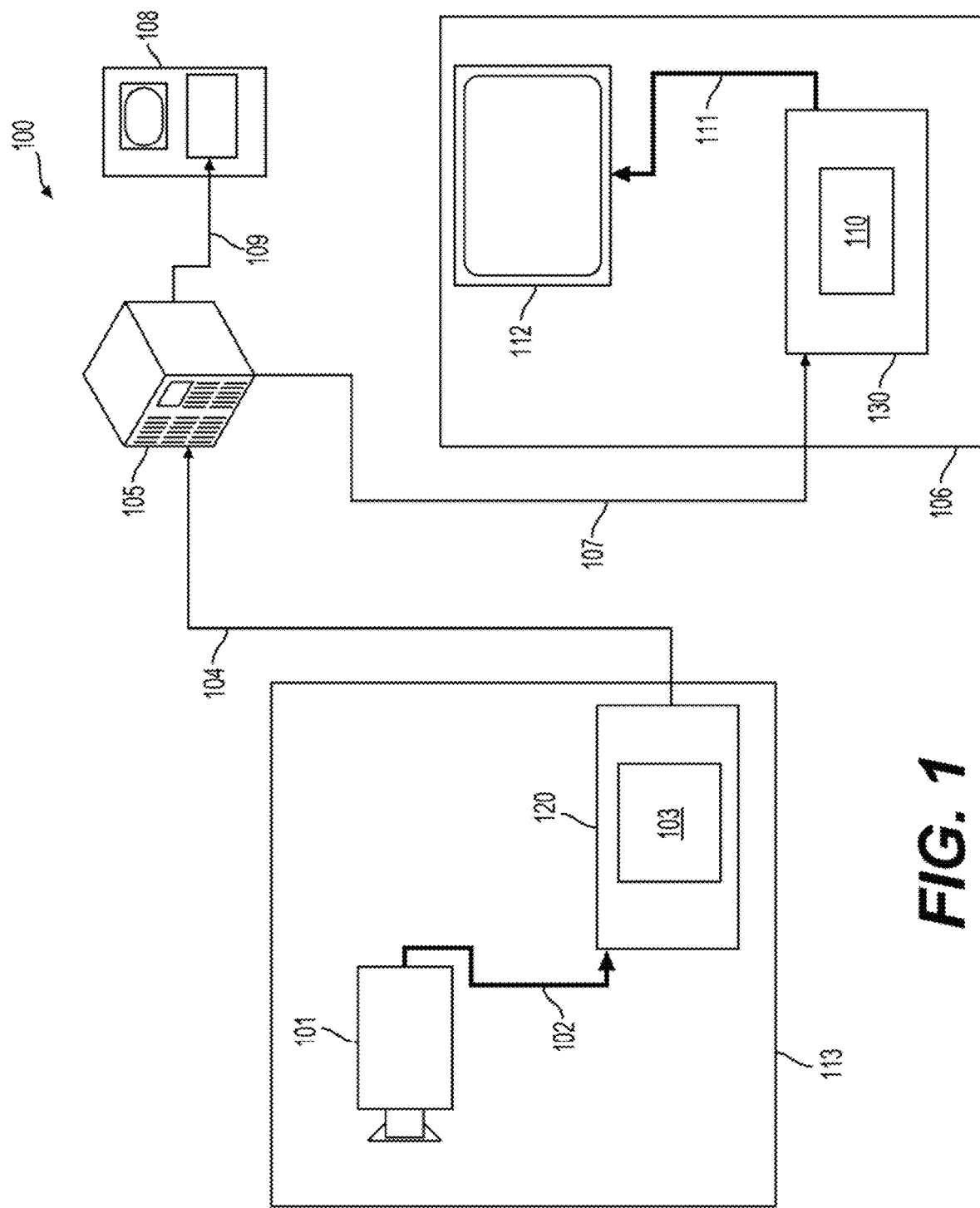
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well. It is noted that pictures in a video sequence can be referred to as frames in some examples.

Figure 2:
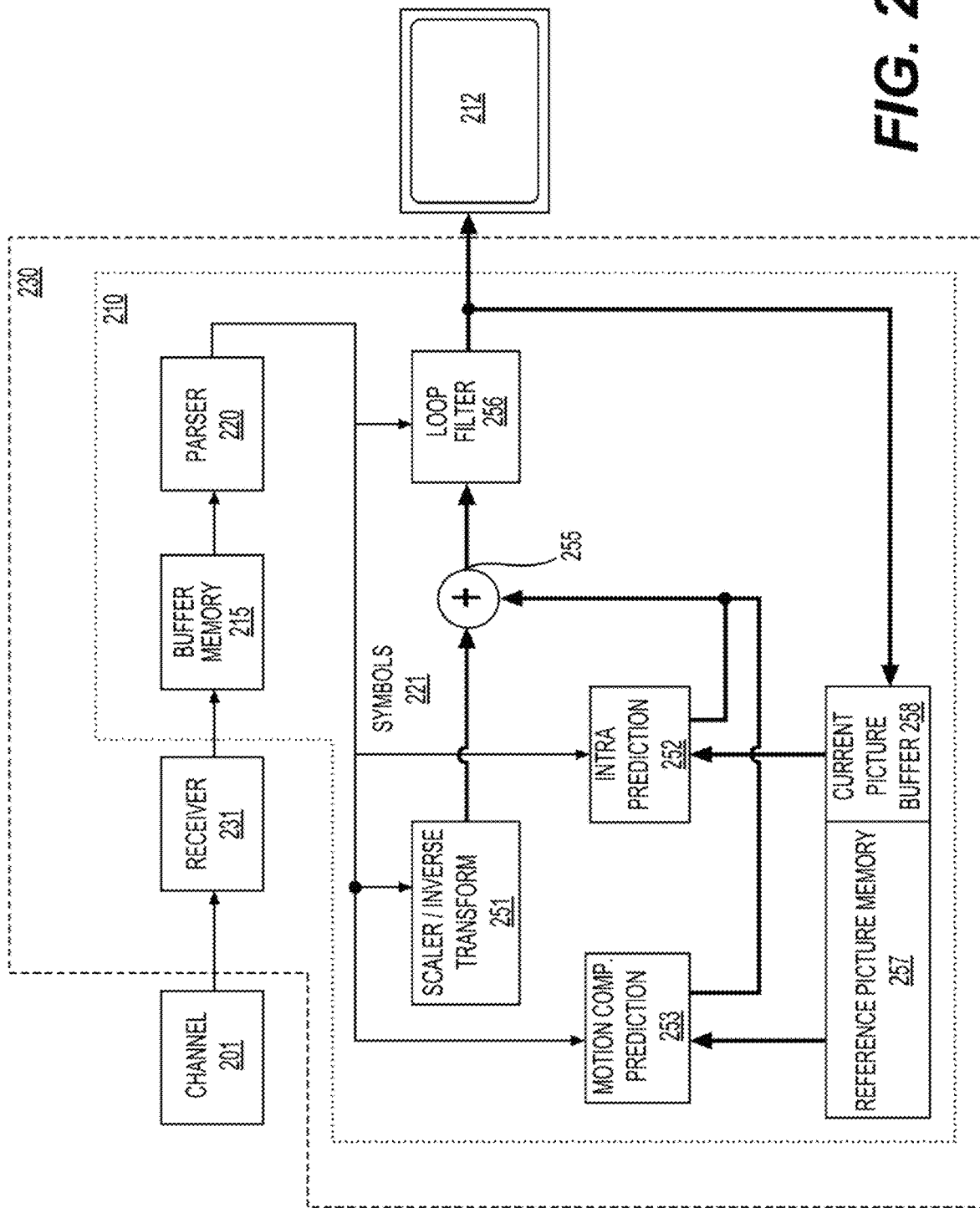
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
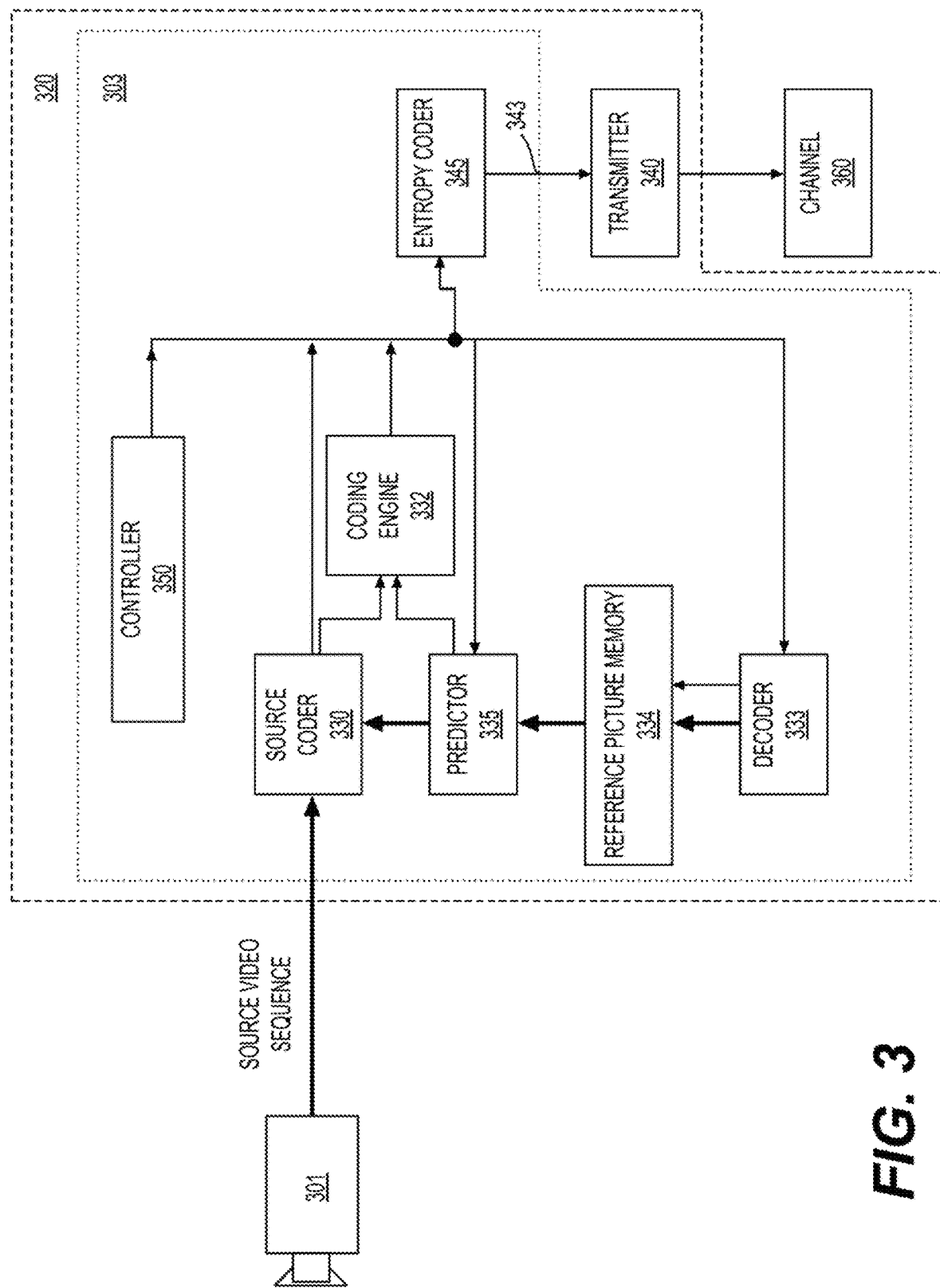
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for feature based cross-component sample offset (CCSO) optimization and signaling improvement. The techniques can be used with filtering techniques in various video standards, such as AOMedia Video 1 (AV1) standard, the High Efficiency Video Coding (HEVC) standard, Versatile Video Coding (VVC) standard, and the like.

According to some aspects of the disclosure, filtering techniques are used to implement loop filter, such as the loop filter (256), in decoder and/or encoder. In some examples (e.g., VVC), an adaptive loop filter (ALF) with block-based filter adaption can be applied by encoders/decoders to reduce artifacts. For a luma component, one of a plurality of filters (e.g., 25 filters) can be selected for a 4×4 luma block, for example, based on a direction and activity of local gradients. In some examples, each filter includes a set of filter coefficients, and the plurality of filters may correspond to different sets of filter coefficients.

An ALF can have any suitable shape and size.

Figures 4, 5A, 5B, 5C, 5D:
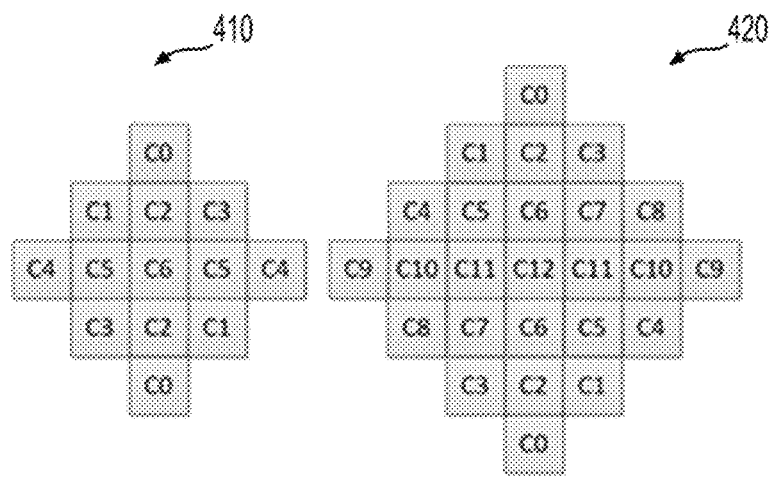
FIG. 4 shows a diagram of filter shapes in some examples.
FIGS. 5A-5D show examples of subsampled positions in some examples.

FIG. 4 shows a diagram of filter shapes in some examples. FIG. 4 shows a first diamond filter shape (410) and a second diamond filter shape (420). The first diamond filter (410) is referred to as a 5×5 diamond shape, and the second diamond filter shape (420) is referred to as a 7×7 diamond shape. The first diamond filter shape (410) includes seven values (shown by C0-C6) that are assigned to locations in the 5×5 diamond shape as the filter coefficients for the corresponding locations. The second diamond filter shape (420) includes thirteen values (shown by C0-C12) that are assigned to locations in the 7×7 diamond shape as the filter coefficients for the corresponding locations. In an example, the first diamond filter shape (410) is applied for chroma components, and the second diamond filter shape (420) is applied for luma component. It is noted that other suitable filter shapes can be used in ALF.

According to an aspect of the disclosure, block classification can be applied to classify each 4×4 block into a class for filter selection. In some examples, for block classification of a luma component, a 4×4 block (or luma block, luma CB) can be categorized or classified as one of multiple (e.g., 25) classes. A classification index C can be derived based on a directionality parameter D and a quantized value A of an activity value A, for example according to Eq. (1):

$$C = 5D + \hat{A} \quad \text{Eq. (1)}$$

In some examples, to calculate the directionality parameter D and the quantized value Â, gradients $g_v$, $g_h$, $g_{d1}$, and $g_{d2}$ respective for a vertical direction, a horizontal direction, and two diagonal directions (e.g., d1 and d2), respectively, can be calculated using 1-D Laplacian, such as according to Eq. (2)-Eq. (5).

$$g_v = \sum_{k=i-2}^{i+3} \sum_{l=j-2}^{j+3} V_{k,l}, \ V_{k,l} = |2R(k,l) - R(k, l-1) - R(k, l+1)| \quad \text{Eq. (2)}$$

$$g_h = \sum_{k=i-2}^{i+3} \sum_{l=j-2}^{j+3} H_{k,l}, \ H_{k,l} = |2R(k,l) - R(k-1, l) - R(k+1, l)| \quad \text{Eq. (3)}$$

$$g_{d1} = \sum_{k=i-2}^{i+3} \sum_{l=j-2}^{j+3} D1_{k,l}, \quad \text{Eq. (4)}$$

$$D1_{k,l} = |2R(k,l) - R(k-1, l-1) - R(k+1, l+1)|$$

$$g_{d2} = \sum_{k=i-2}^{i+3} \sum_{j=j-2}^{j+3} D2_{k,l}, \quad \text{Eq. (5)}$$

$$D2_{k,l} = |2R(k,l) - R(k-1, l+1) - R(k+1, l-1)|$$

where indices i and j refer to coordinates of an upper left sample within the 4×4 block and R(k,l) indicates a reconstructed sample at a coordinate (k,l).

To reduce complexity of the block classification described above, a subsampled 1-D Laplacian calculation can be applied.

FIGS. 5A-5D show examples of subsampled positions in some examples. In the FIGS. 5A-5D, the same subsampled positions can be used for gradient calculation of the different directions. FIG. 5A shows the subsampled positions (labeled by 'V') to calculate the vertical gradient $g_v$. FIG. 5B shows the subsampled positions (labeled by 'H') to calculate the horizontal gradient $g_h$. FIG. 5C shows the subsampled positions (labeled by 'D1') to calculate the d1 diagonal gradient $g_{d1}$. FIG. 5D shows the subsampled positions (labeled by 'D2') to calculate the d2 diagonal gradient $g_{d2}$.

In some examples, a maximum value $g_{h,v}^{max}$ and a minimum value $g_{h,v}^{min}$ of the gradients of horizontal and vertical directions $g_v$ and $g_h$ can be set as according to Eq. (6):

$$g_{h,v}^{max} = \max(g_h, g_v), \ g_{h,v}^{min} = \min(g_h, g_v) \quad \text{Eq. (6)}$$

A maximum value $g_{d1,d2}^{max}$ and a minimum value $g_{d1,d2}^{min}$ of the gradients of two diagonal directions $g_{d1}$ and $g_{d2}$ can be set as according to Eq. (7)

$$g_{d1,d2}^{max} = \max(g_{d1}, g_{d2}), \ g_{d1,d2}^{min} = \min(g_{d1}, g_{d2}) \quad \text{Eq. (7)}$$

In some examples, the directionality parameter D can be derived based on the above values and two thresholds $t_1$ and $t_2$, for example according to below steps:

Step 1. If (1) $g_{h,v}^{max} \leq t_1 \cdot g_{h,v}^{min}$ and (2) $g_{d1,d2}^{max} \leq t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue to Step 3; otherwise continue to Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

In some examples, the activity value A can be calculated as according to Eq. (8):

$$A = \sum_{k=i-2}^{i+3}\sum_{l=j-2}^{j+3}(V_{k,l} + H_{k,l}) = g_v + g_h \qquad \text{Eq. (8)}$$

A can be further quantized to a range of 0 to 4, inclusively, and the quantized value is denoted as Â.

In some examples, for chroma components in a picture, no block classification is applied, and thus a single set of ALF coefficients can be applied for each chroma component.

Geometric transformations can be applied to filter coefficients and corresponding filter clipping values (also referred to as clipping values). In some examples, before filtering a block (e.g., a 4×4 luma block), geometric transformations, such as rotation or diagonal and vertical flipping, can be applied to the filter coefficients f(k,l) and the corresponding filter clipping values c(k,l), for example, depending on gradient values (e.g., $g_v$, $g_h$, $g_{d1}$, and/or $g_{d2}$) calculated for the block. The geometric transformations applied to the filter coefficients f(k,l) and the corresponding filter clipping values c(k,l) can be equivalent to applying the geometric transformations to samples in a region supported by the filter. The geometric transformations can make different blocks to which an ALF is applied more similar by aligning the respective directionality.

In some examples, three geometric transformations, including a diagonal flip, a vertical flip, and a rotation can be performed as described by Eqs. (9)-(11), respectively:

$$f_D(k, l) = f(l, k), c_D(k, l) = c(l, k), \qquad \text{Eq. (9)}$$

$$f_V(k, l) = f(k, K - l - 1), c_V(k, l) = c(k, K - l - 1) \qquad \text{Eq. (10)}$$

$$f_R(k, l) = f(K - l - 1, k), c_R(k, l) = c(K - l - 1, k) \qquad \text{Eq. (11)}$$

where K is a size of the ALF or the filter, and 0≤k, l≤K−1 are coordinates of coefficients. For example, a location (0,0) is at an upper left corner and a location (K−1, K−1) is at a lower right corner of the filter f or a clipping value matrix (or clipping matrix) c. The transformations can be applied to the filter coefficients f (k, l) and the clipping values c(k,l) depending on the gradient values calculated for the block. An example of a relationship between the transformation and the four gradients are summarized in Table 1.

TABLE 1

Mapping of the gradient calculated for a block and the transformation

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In some embodiments, ALF filter parameters are signaled in an Adaptation Parameter Set (APS) for a picture. In the APS, one or more sets (e.g., up to 25 sets) of luma filter coefficients and clipping value indexes can be signaled. In an example, a set of the one or more sets can include luma filter coefficients and one or more clipping value indexes. One or more sets (e.g., up to 8 sets) of chroma filter coefficients and clipping value indexes can be signaled. To reduce signaling overhead, filter coefficients of different classifications (e.g., having different classification indices) for luma components can be merged. In a slice header, indices of the APSs used for a current slice can be signaled. In some examples, the signaling of ALF is CTU based.

In an embodiment, a clipping value index (also referred to as clipping index) can be decoded from the APS. The clipping value index can be used to determine a corresponding clipping value, for example, based on a relationship between the clipping value index and the corresponding clipping value. The relationship can be pre-defined and stored in a decoder. In an example, the relationship is described by a table, such as a luma table (e.g., used for a luma CB) of the clipping value index and the corresponding clipping value, a chroma table (e.g., used for a chroma CB) of the clipping value index and the corresponding clipping value. The clipping value can be dependent of a bit depth B. The bit depth B can refer to an internal bit depth, a bit depth of reconstructed samples in a CB to be filtered, or the like. In some examples, a table (e.g., a luma table, a chroma table) is obtained using Eq. (12).

$$AlfClip = \left\{ \text{round}\left(2^{B\frac{N-n+1}{N}}\right) \text{ for } n \in [1 \dots N] \right\}, \qquad \text{Eq. (12)}$$

where AlfClip is the clipping value, B is the bit depth (e.g., bitDepth), N (e.g., N=4) is a number of allowed clipping values, and (n−1) is the clipping value index (also referred to as clipping index or clipIdx). Table 2 shows an example of a table obtained using Eq. (12) with N=4. The clipping index (n−1) can be 0, 1, 2, and 3 in Table 2, and n can be 1, 2, 3, and 4, respectively. Table 2 can be used for luma blocks or chroma blocks.

TABLE 2

AlfClip can depend on the bit depth B and clipIdx

| | clipIdx | | | |
| --- | --- | --- | --- | --- |
| bitDepth | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

In a slice header for a current slice, one or more APS indices (e.g., up to 7 APS indices) can be signaled to specify luma filter sets that can be used for the current slice. The filtering process can be controlled at one or more suitable levels, such as a picture level, a slice level, a CTB level, and/or the like. In an embodiment, the filtering process can be further controlled at a CTB level. A flag can be signaled to indicate whether the ALF is applied to a luma CTB. The luma CTB can choose a filter set among a plurality of fixed filter sets (e.g., 16 fixed filter sets) and the filter set(s) (also referred to as signaled filter set(s)) that are signaled in the APSs. A filter set index can be signaled for the luma CTB to indicate the filter set (e.g., the filter set among the plurality of fixed filter sets and the signaled filter set(s)) to be applied. The plurality of fixed filter sets can be pre-defined and hard-coded in an encoder and a decoder, and can be referred to as pre-defined filter sets.

For a chroma component, an APS index can be signaled in the slice header to indicate the chroma filter sets to be used for the current slice. At the CTB level, a filter set index can be signaled for each chroma CTB if there is more than one chroma filter set in the APS.

The filter coefficients can be quantized with a norm equal to 128. In order to reduce the multiplication complexity, a bitstream conformance can be applied so that the coefficient value of the non-central position can be in a range of −27 to 27-1, inclusive. In an example, the central position coefficient is not signaled in the bitstream and can be considered as equal to 128.

In some embodiments, the syntaxes and semantics of clipping index and clipping values are defined as follows:

alf_luma_clip_idx[sfIdx][j] can be used to specify the clipping index of the clipping value to use before multiplying by the j-th coefficient of the signaled luma filter indicated by sfIdx. A requirement of bitstream conformance can include that the values of alf_luma_clip_idx[sfIdx][j] with sfIdx=0 to alf_luma_num_filters_signalled_minus1 and j=0 to 11 shall be in the range of 0 to 3, inclusive.

The luma filter clipping values AlfClipL[adaptation_parameter_set_id] with elements AlfClipL[adaptation_parameter_set_id][filtIdx][j], with filtIdx=0 to NumAlfFilters−1 and j=0 to 11 can be derived as specified in Table 2 depending on bitDepth set equal to BitDepthY and clipIdx set equal to alf_luma_clip_idx [alf_luma_coeff_delta_idx[filtIdx] ][j].

alf_chroma_clip_idx[altIdx][j] can be used to specify the clipping index of the clipping value to use before multiplying by the j-th coefficient of the alternative chroma filter with index altIdx. A requirement of bitstream conformance can include that the values of alf_chroma_clip_idx[altIdx][j] with altIdx=0 to alf_chroma_num_alt_filters_minus1, j=0 to 5 shall be in the range of 0 to 3, inclusive.

The chroma filter clipping values AlfClipC[adaptation_parameter_set_id][altIdx] with elements AlfClipC[adaptation_parameter_set_id][altIdx][j], with altIdx=0 to alf_chroma_num_alt_filters_minus1, j=0 to 5 can be derived as specified in Table 2 depending on bitDepth set equal to BitDepthC and clipIdx set equal to alf_chroma_clip_idx[altIdx][j].

In an embodiment, the filtering process can be described as below. At a decoder side, when the ALF is enabled for a CTB, a sample R(i,j) within a CU (or CB) can be filtered, resulting in a filtered sample value R'(i,j) as shown below using Eq. (13). In an example, each sample in the CU is filtered.

$$R'(i, j) = R(i, j) + \left(\left(\sum_{k\neq 0}\sum_{l\neq 0} f(k, l) \times K(R(i+k, j+l) - R(i, j), c(k, l)) + 64\right) \gg 7\right) \quad \text{Eq. (13)}$$

where f(k,l) denotes the decoded filter coefficients, K(x, y) is a clipping function, and c(k, l) denotes the decoded clipping parameters (or clipping values). The variables k and l can vary between −L/2 and L/2 where L denotes a filter length. The clipping function K(x, y)=min (y, max(−y, x)) corresponds to a clipping function Clip3 (−y, y, x). By incorporating the clipping function K(x, y), the loop filtering method (e.g., ALF) becomes a non-linear process, and can be referred to a nonlinear ALF.

In the nonlinear ALF, multiple sets of clipping values can be used. In an example, a luma set includes four clipping values {1024, 181, 32, 6}, and a chroma set includes 4 clipping values {1024, 161, 25, 4}. The four clipping values in the luma set can be selected by approximately equally splitting, in a logarithmic domain, a full range (e.g., 1024) of the sample values (coded on 10 bits) for a luma block. The range can be from 4 to 1024 for the chroma set.

The selected clipping values can be coded in an "alf_data" syntax element as follows: a suitable encoding scheme (e.g., a Golomb encoding scheme) can be used to encode a clipping index corresponding to the selected clipping value. The encoding scheme can be the same encoding scheme used for encoding the filter set index.

In some examples, a cross-component filtering process can apply cross-component filters, such as cross-component adaptive loop filters (CC-ALFs) in the loop filter, such as the loop filter (256), and the like in decoder and encoder. The cross-component filter can use luma sample values of a luma component (e.g., a luma CB) to refine a chroma component (e.g., a chroma CB corresponding to the luma CB). In an example, the luma CB and the chroma CB are collocated in a CU.

Figure 6:
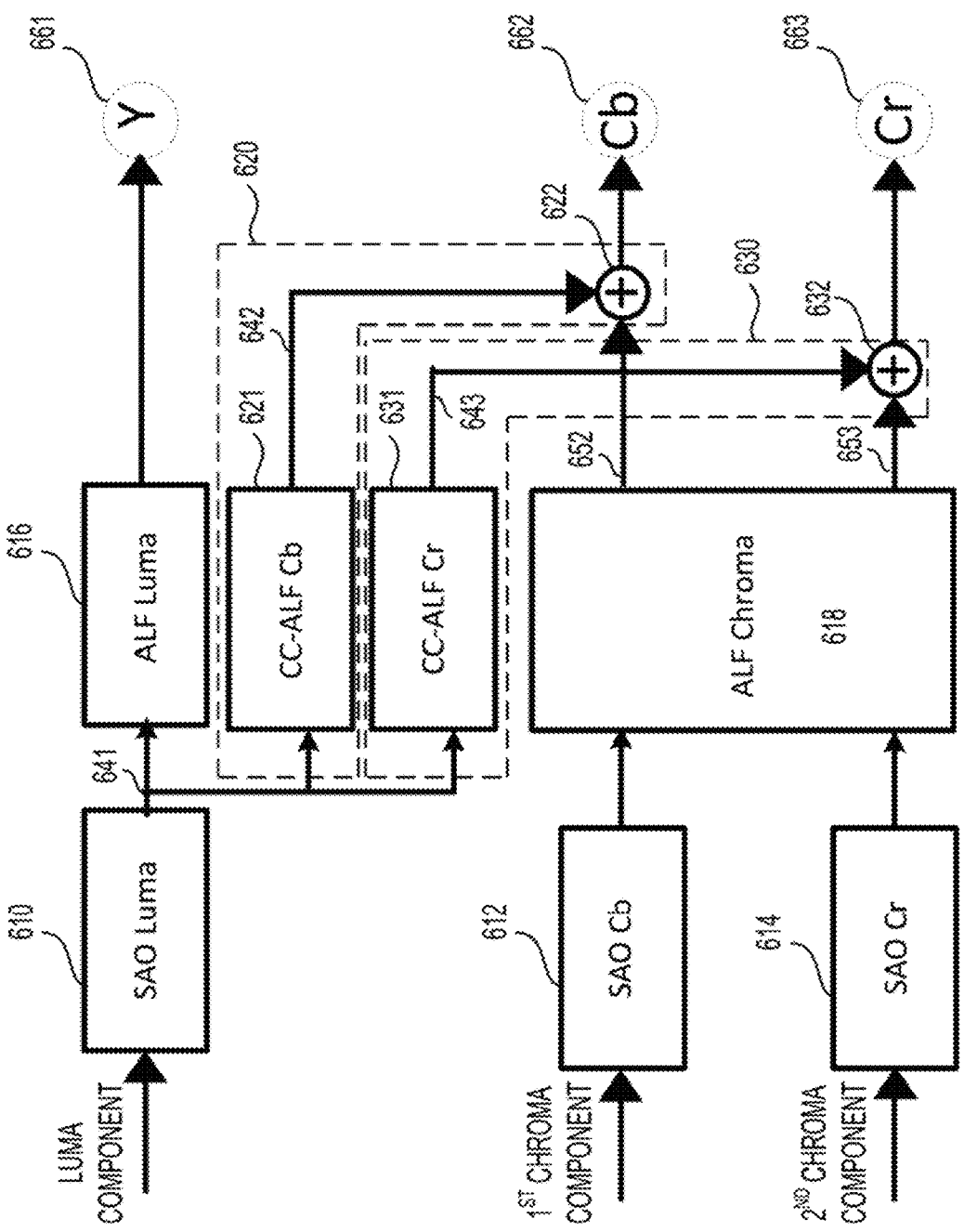
FIG. 6 shows cross-component filters used to generate chroma components according to an embodiment of the disclosure.

FIG. 6 shows cross-component filters (e.g., CC-ALFs) used to generate chroma components according to an embodiment of the disclosure. In some examples, FIG. 6 shows filtering processes for a first chroma component (e.g., a first chroma CB), a second chroma component (e.g., a second chroma CB), and a luma component (e.g., a luma CB). The luma component can be filtered by a sample adaptive offset (SAO) filter (610) to generate a SAO filtered luma component (641). The SAO filtered luma component (641) can be further filtered by an ALF luma filter (616) to become a filtered luma CB (661) (e.g., 'Y').

The first chroma component can be filtered by a SAO filter (612) and an ALF chroma filter (618) to generate a first intermediate component (652). Further, the SAO filtered luma component (641) can be filtered by a cross-component filter (e.g., CC-ALF) (621) for the first chroma component to generate a second intermediate component (642). Subsequently, a filtered first chroma component (662) (e.g., 'Cb') can be generated based on at least one of the second intermediate component (642) and the first intermediate component (652). In an example, the filtered first chroma component (662) (e.g., 'Cb') can be generated by combining the second intermediate component (642) and the first intermediate component (652) with an adder (622). The cross-component adaptive loop filtering process for the first chroma component can include a step performed by the CC-ALF (621) and a step performed by, for example, the adder (622).

The above description can be adapted to the second chroma component. The second chroma component can be filtered by a SAO filter (614) and the ALF chroma filter (618) to generate a third intermediate component (653). Further, the SAO filtered luma component (641) can be filtered by a cross-component filter (e.g., a CC-ALF) (631) for the second chroma component to generate a fourth intermediate component (643). Subsequently, a filtered second chroma component (663) (e.g., 'Cr') can be generated based on at least one of the fourth intermediate component (643) and the third intermediate component (653). In an example, the filtered second chroma component (663) (e.g., 'Cr') can be generated by combining the fourth intermediate component (643) and the third intermediate component (653) with an adder (632). In an example, the cross-component adaptive loop filtering process for the second chroma component can include a step performed by the CC-ALF (631) and a step performed by, for example, the adder (632).

A cross-component filter (e.g., the CC-ALF (621), the CC-ALF (631)) can operate by applying a linear filter having any suitable filter shape to the luma component (or a luma channel) to refine each chroma component (e.g., the first chroma component, the second chroma component).

Figure 7:
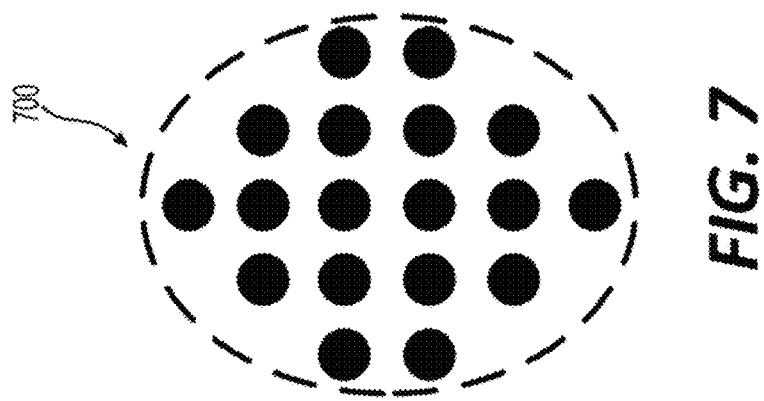
FIG. 7 shows an example of a filter shape according to an embodiment of the disclosure.

FIG. 7 shows an example of a filter shape (700) according to an embodiment of the disclosure. The filter shape (700) has a diamond shape, and each black dot indicates a location with an assigned filter coefficient. The filter coefficients for the filter shape (700) can include non-zero filter coefficients and zero filter coefficients.

The CC-ALF can include any suitable filter coefficients (also referred to as the CC-ALF filter coefficients). Referring back to FIG. 6, the CC-ALF (621) and the CC-ALF (631) can have a same filter shape, such as the diamond shape (700) shown in FIG. 7, and a same number of filter coefficients. In an example, values of the filter coefficients in the CC-ALF (621) are different from values of the filter coefficients in the CC-ALF (631).

In general, filter coefficients in a CC-ALF can be transmitted, for example, in the APS. In an example, the filter coefficients can be scaled by a factor (e.g., $2^{10}$) and can be rounded for a fixed point representation. Application of a CC-ALF can be controlled on a variable block size and signaled by a context-coded flag (e.g., a CC-ALF enabling flag) received for each block of samples. The context-coded flag, such as the CC-ALF enabling flag, can be signaled at any suitable level, such as a block level. The block size along with the CC-ALF enabling flag can be received at a slice-level for each chroma component. In some examples, block sizes (in chroma samples) 16×16, 32×32, and 64×64 can be supported.

FIG. 8 shows a syntax example for CC-ALF according to some embodiments of the disclosure. In the FIG. 8 example,
  alf_ctb_cross_component_cb_idc[xCtb>>CtbLog 2 SizeY][yCtb>>CtbLog 2 SizeY] is an index to indicate whether a cross component Cb filter is used and an index of the cross component Cb filter if used. For example, when
  alf_ctb_cross_component_cb_idc[xCtb>>CtbLog 2 SizeY][yCtb>>CtbLog 2 SizeY] is equal to 0, the cross component Cb filter is not applied to block of Cb colour component samples at luma location (xCtb, yCtb); when
  alf_ctb_cross_component_cb_idc[xCtb>>CtbLog 2 SizeY][yCtb>>CtbLog 2 SizeY] is not equal to 0,
  alf_ctb_cross_component_cb_idc[xCtb>>CtbLog 2 SizeY][yCtb>>CtbLog 2 SizeY] is an index for a filter to be applied. For example,
  alf_ctb_cross_component_cb_idc[xCtb>>CtbLog 2 SizeY][yCtb>>CtbLog 2 SizeY]-th cross component Cb filter is applied to the block of Cb colour component samples at luma location (xCtb, yCtb)

Further, in the FIG. 8 example,
  alf_ctb_cross_component_cr_idc[xCtb>>CtbLog 2 SizeY][yCtb>>CtbLog 2 SizeY] is used to indicate whether a cross component Cr filter is used and index of the cross component Cr filter is used. For example, when
  alf_ctb_cross_component_cr_idc[xCtb>>CtbLog 2 SizeY][yCtb>>CtbLog 2 SizeY] is equal to 0, the cross component Cr filter is not applied to block of Cr colour component samples at luma location (xCtb, yCtb); when
  alf_ctb_cross_component_cr_idc[xCtb>>CtbLog 2 SizeY][yCtb>>CtbLog 2 SizeY] is not equal to 0,
  alf_ctb_cross_component_cr_idc[xCtb>>CtbLog 2 SizeY][yCtb>>CtbLog 2 SizeY] is the index of the cross component Cr filter. For example,
  alf_cross_component_cr_idc[xCtb>>CtbLog 2 SizeY][yCtb>>CtbLog 2 SizeY]-th cross component Cr filter can be applied to the block of Cr colour component samples at luma location (xCtb, yCtb).

In some examples (e.g., HEVC), a filtering technique that is referred to as sample adaptive offset (SAO) can be used. In some examples, SAO is applied to the reconstruction signal after a deblocking filter. The deblocking filter can be used in a loop filter or a post filter. The loop filter, such as the loop filter (256), is in the coding loop, and the post filter is out of the coding loop (e.g., operate on a display buffer) in some examples. SAO can use the offset values given in the slice header. In some examples, for luma samples, the encoder can decide whether to apply (enable) SAO on a slice. When SAO is enabled, the current picture allows recursive splitting of a coding unit into four sub-regions and each sub-region can select an SAO type from multiple SAO types based on features in the sub-region. In some examples, a sub-region corresponds to a CTB. In some examples, a sub-region can be a smaller block than the CTB. In some examples, the features include band features and edge features. The band features are detected according to pixel intensity. The edge features are detected according to edge pattern directions in the sub-region. In some examples, features of a sub-region are to classify the sub-region into one of SAO type. For example, edge properties can be used to classify a sub-region into four SAO types, and pixel intensity can be used for pixel classification in two SAO types. Each SAO type can include a plurality of categories that correspond to respective offsets.

In some examples, for each sub-region, the encoder can try every SAO type and determines the best SAO type based on rate-distortion performance. The classification for categories of samples in the sub-region are performed by both encoder and decoder. Thus, in some examples, the encoder transmits the best SAO type and the offsets for categories associated with the best SAO type for each sub-region to the decoder.

Figures 9, 10:
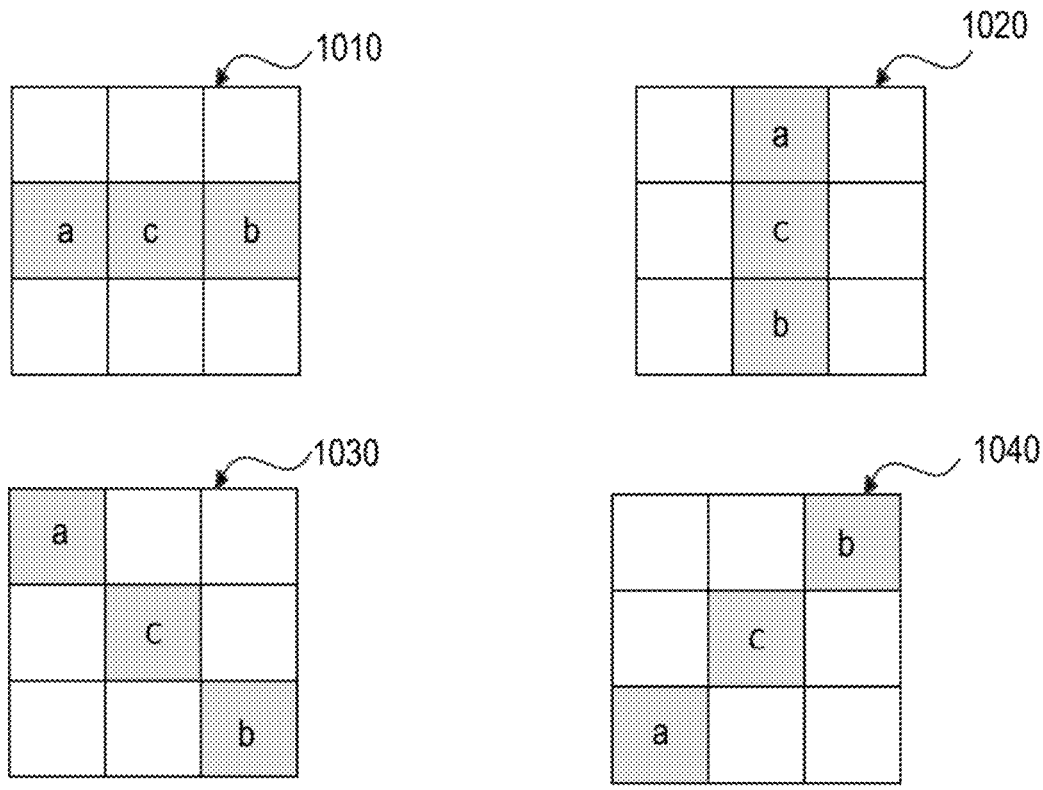
FIG. 9 shows a table of a plurality of sample adaptive offset (SAO) types according to an embodiment of the disclosure.
FIG. 10 shows examples of 3-pixel patterns for pixel classification in edge offset types in some examples.

FIG. 9 shows a table (900) of a plurality of SAO types according to an embodiment of the disclosure. In the table (900), SAO types 0-6 are shown. It is noted that SAO type 0 is used to indicate no SAO application. Further, each SAO type of SAO type 1 to SAO type 6 includes multiple categories. SAO can classify reconstructed pixels of a sub-region into categories and reduce the distortion by adding an offset to pixels of each category in the sub-region.

Specifically, in an embodiment, for SAO types 5-6 that are also referred to as band offset (BO) types in some examples, pixels of a sub-region (e.g., CTU) are classified according to the pixel intensity into multiple bands, and respective band offsets can be applied to the multiple bands. Each band of the multiple bands includes pixels in the same intensity interval. In some examples, the intensity range is equally divided into a plurality of intervals, such as 32 intervals from zero to the maximum intensity value (e.g., 255 for 8-bit pixels), and each interval is associated with an offset. Further, in an example, the 32 bands are divided into two groups, such as a first group and a second group. The first group includes the central 16 bands (e.g., 16 intervals that are in the middle of the intensity range), while the second group includes the rest 16 bands (e.g., 8 intervals that are at the low side of the intensity range and 8 intervals that are at the high side of the intensity range). In an example, only offsets of one of the two groups are transmitted. In some examples, the offsets to transmit are determined based on rate distortion performance. In some embodiments, when the pixel classification operation in BO types is used, the five most significant bits of each pixel can be directly used as the band index.

Further, in an embodiment, such as SAO types 1-4, edge offset (EO) types can be used for pixel classification and determination of offsets. For example, pixel classification can be determined based on 1-dimensional 3-pixel patterns with consideration of edge directional information. In some examples, FIG. 10 shows examples of 3-pixel patterns for pixel classification in edge offset types in some examples. In the FIG. 10 example, a first pattern (1010) (as shown by 3 grey pixels) is used for 1D 0-degree pattern (horizontal) (SAO type 1), a second pattern (1020) (as shown by 3 grey pixels) is used for as 1D 90-degree pattern (vertical) (SAO type 2), a third pattern (1030) (as shown by 3 grey pixels) is used for 1D 135-degree pattern (SAO type 3) and a fourth pattern (1040) (as shown by 3 grey pixels) is used for 1D 45-degree pattern (SAO type 4). In an example, one of the four directional patterns shown in FIG. 10 can be selected considering the SAO type of a sub-region. Then, pixels in the sub-region can be classified into multiple categories by comparing each pixel (e.g., c) with its two neighboring pixels (a and b) according to the pattern associated with the SAO type of the sub-region.

In some examples, each pixel is classified into 4 categories. In an example, for a pixel c, when c<a && c<b, the pixel c is classified as category 1; when (c<a&&c==b)∥(c==a&&c<b), the pixel c is classified as category 2; when (c>a&&c==b)∥(c==a&&c>b), the pixel c is classified as category 3; and when c>a && c>b, the pixel c is classified as category 4.

Figures 11, 12, 13:
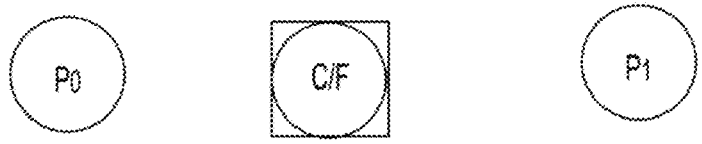
FIG. 11 shows a table for pixel classification rule for edge offset in some examples.
FIG. 12 shows an example of a filter support area according to some embodiments of the disclosure.
FIG. 13 shows a table having 9 combinations according to an embodiment of the disclosure.

FIG. 11 shows a table (1100) for pixel classification rule for edge offset in some examples. Specifically, a pixel c (also shown in each pattern of FIG. 10) is compared with two neighboring pixels (a and b, also shown by grey color in each pattern of FIG. 10), and the pixel c can be classified into one of category 0-4 based on the comparison according to the pixel classification rule shown in FIG. 11.

In some embodiments, the SAO on the decoder side can be operated independently of largest coding unit (LCU) (e.g., CTU), so that the line buffers can be saved. In some examples, pixels of the top and bottom rows in each LCU are not SAO processed when the 90-degree, 135-degree, and 45-degree classification patterns are chosen; pixels of the leftmost and rightmost columns in each LCU are not SAO processed when the 0-degree, 135-degree, and 45-degree patterns are chosen.

Generally, a cross-component filtering process can use the reconstructed samples of a first color component as input (e.g., Y or Cb or Cr, or R or G or B) to generate an output, and the output of the filtering process is applied on a second color component that is different from the first color component.

In some examples, filter coefficients for the cross-component filtering (CCF) are derived based on some mathematical equations. The derived filter coefficients are signaled from encoder side to the decoder side, and the derived filter coefficients are used to generate offsets using linear combinations. The generated offsets are then added to reconstructed samples as a filtering process. For example, the offsets are generated based on linear combinations of the filtering coefficients with luma samples, and the generated offsets are added to the reconstructed chroma samples.

In some examples, non linear mapping techniques can be used in the cross-component filtering to generate cross-component sample offset (CCSO), and the techniques can be referred to as CCSO.

In an example, CCSO can be used as loop filtering to reduce distortion of reconstructed samples. It is noted that CCSO does not rely on the assumption of linear mapping relationship between the luma reconstructed sample values and the delta values between the original chroma samples and chroma reconstructed samples.

In some examples, for CCSO, a non-linear mapping is derived at encoder side. A non-linear mapping is between reconstructed samples of a first color component in the filter support region and offsets to be added to a second color component in the filter support region. The second color component is different from the first color component. The domain of the non-linear mapping is determined by different combinations of processed input reconstructed samples (also referred to as combinations of possible reconstructed sample values).

Techniques of CCSO can be illustrated using a specific example. In the specific example, reconstructed samples from a first color component located in a filter support area (also referred to as "filter support region") are determined. The filter support area is an area within which the filter can be applied, and the filter support area can have any suitable shape.

FIG. 12 shows an example of a filter support area (1200) according to some embodiments of the disclosure. The filter support area (1200) includes three reconstructed samples: P0, P1 and C of a first color component, C denotes the center sample and P0 and P1 denote neighboring samples of C in the horizontal direction. P0 and P1 can be immediate neighbors of C or non-immediate neighbors of C. The filter support area (1200) also includes a sample F at the center position of a second color component. The sample C and the sample F are collocated, and of different color components. The reconstructed samples P0, P1 and C are input to CCSO.

In some examples, the reconstructed samples, such as P0, P1 and C in the specific examples, are input to CCSO that processes the inputs to form filter taps. In the specific example, the reconstructed samples are processed in following two steps.

In a first step, the delta values respectively between P0-P1 and C are computed. For example, m0 denotes the delta value between P0 to C; m1 denotes the delta value between P1 to C.

In a second step, the delta values m0-m1 are further quantized, the quantized values are denoted as d0 and d1. In an example, the quantized value can be one of −1, 0, 1 based on a quantization process. For example, a value m can be quantized to −1 when m is smaller than −N (N is a positive value and is referred to as quantization step size); the value m can be quantized to 0 when m is in a range of [−N, N]; and the value m can be quantized to 1 when m is greater than N. In some examples, the quantization step size N can be one of 4, 8, 12, 16 and the like.

In some embodiments, the quantized values d0-d1 are filter taps and can be used to identify one combination in the filter domain. For example, the filter taps d0-d1 can form a combination in the filter domain. Each filter tap can have three quantized values, thus when two filter taps are used, the filter domain includes 9 (3×3) combinations.

FIG. 13 shows a table (1300) having 9 combinations according to an embodiment of the disclosure. The table (1300) includes 9 rows corresponding to 9 combinations. In each row corresponding to a combination, the first column includes an index of the combinations; the second column includes the value of filter tap d0 for the combination; the third column includes the value of filter tap d1 for the combination; the fourth column includes the offset value associated with the combination for the non linear mapping. In an example, when the filter taps d0-d1 are determined, the offset value (denoted by s) associated with the combination of d0-d1 can be determined according to the table (1300). In an example, offset values s0-s8 are integers, such as 0, 1, −1, 3, −3, 5, −5, −7, and the like.

In some examples, positions of the neighboring samples P0 and P1 can be selected from a plurality of candidate positions, and the filter shapes can be switched.

Figures 14, 15:
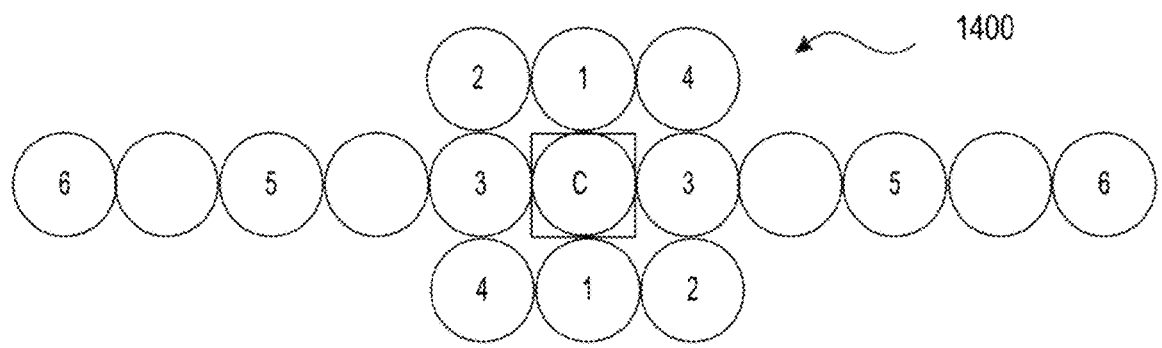
FIG. 14 shows a diagram illustrating a filter support area of switchable filter shapes in some examples.
FIG. 15 shows a table of quantized values in some examples.

FIG. 14 shows a diagram illustrating a filter support area (1400) of switchable filter shapes in some examples. The filter support area (1400) includes a center sample C and 6 pairs of neighboring samples 1 to 6. Each pair of neighboring samples and the center sample C can form a filter shape of 3 taps. For example, the pair of neighboring samples 1 and the center sample C form a first filter shape; the pair of neighboring samples 2 and the center sample C form a second filter shape; the pair of neighboring samples 3 and the center sample C form a third filter shape; the pair of neighboring samples 4 and the center sample C form a fourth filter shape; the pair of neighboring samples 5 and the center sample C form a fifth filter shape; the pair of neighboring samples 6 and the center sample C form a sixth filter shape. In some examples, filter shape can be switched at frame level. For example, a signal at the frame level can indicate a selected filter shape from the 6 filter shapes.

In some embodiments, the final filtering process of CCSO can be applied as shown in Eq. (14):

$$f' = \text{clip}(F + s) \quad \text{Eq. (14)}$$

where F is the reconstructed sample of the second color component to be filtered, and s is the offset value determined according to filter taps that are processing results of reconstructed samples of first color component, such as using table (1300). The sum of the reconstructed sample F and the offset value s is further clipped into the range associated with bit-depth to determine the final filtered sample f' of the second color component.

According to an aspect of the disclosure, at the encoder side, the encoding device can derive a mapping between reconstructed samples of a first color component in a filter support region and the offsets to be added to reconstructed samples of a second color component. The mapping can be any suitable linear or non-linear mapping. Then, the filtering process can be applied at the encoder side and/or the decoder side based on the mapping. For example, the mapping is suitably informed to the decoder (e.g., the mapping is included in a coded video bitstream that is transmitted from the encoder side to the decoder side), and then the decoder can perform the filtering process based on the mapping.

According to an aspect of the disclosure, band features and edge features in SAO can be suitably applied to CCSO. Band and edge features are used jointly for offset derivation where edge feature is derived using the delta value between P0-P1 and C. Fixed number of bands (1, 2, 4, or 8) are used which is signaled in the picture header in an example. The number of pixel values (also referred to as intensity interval) in each band is also fixed. In some examples, reconstructed samples of the first color component (e.g., luma) in a sub-region (e.g., CTU) are classified according to the pixel intensity into multiple bands according to the fixed intensity intervals by both the encoder and the decoder. The encoder can determine, for each band, an offset based on average difference of reconstructed samples and the original samples of the second color component. Then encoder can suitable provide the offsets of the bands to the decoder. Then, the decoder can apply the offsets to the reconstructed samples of the second color component according to the band classification (based on the first color component).

In some examples, signaling of CCSO can be performed at both the frame level and block level. At the frame level, the following syntax elements are signaled: a 1-bit flag indicating whether CCSO is applied in this frame; a 3-bit syntax element (ext_filter_support) indicating the selection of CCSO filter shape; a 2-bit index indicating the selection of quantization step size; and nine 3-bit offset values used in a look-up table. At the 128×128 chroma block-level, a flag is signaled to indicate whether the CCSO filter is enabled or not.

Some aspects of the disclosure provide techniques for entropy coding, such as techniques for context-based adaptive binary arithmetic coding (CABAC). For example, context models in CABAC for coding a current block can be determined based on information from temporal neighboring blocks (also referred to as temporally co-located blocks) of the current block and/or spatial neighboring blocks of the current block. CABAC can be used for coding various syntax elements, such as an inter affine flag (e.g., inter_affine_flag), a subblock merge flag (e.g., merge_subblock_flag), a local illumination compensation (LIC) flag (e.g., lic_flag) and the like. An inter affine flag associated with a coding block is used to indicate whether the coding block is coded using affine motion compensated prediction. A subblock merge flag associated with a coding block is used to indicate whether the coding block is coded using a subblock motion compensation mode. An LIC flag associated with a coding block is used to indicate whether the coding block is coded using local illumination compensation.

CABAC is a coding technique used in entropy coding. Generally, the encoding process of CABAC includes a binarization step, a context modeling step and an arithmetic coding step.

In the binarization step for the CABAC based encoding process, a syntax element of nonbinary value can be mapped to a binary sequence, also referred to as a bin string. The binarization step can be bypassed when the syntax element is provided of a value in binary form (e.g., a binary sequence).

In the context modeling step for the CABAC based encoding process, a probability model is determined depending on previously encoded syntax elements. In some examples, a probability model (also referred to as context or context model in CABAC) can be represented by a probability state (also referred to as context state in some examples) and a most probable symbol (MPS) value. The probability state is associated with a probability value and can implicitly represent that the probability of a particular symbol (e.g., a bin) being the Least Probable Symbol (LPS) is equal to the probability value. A symbol can be an LPS or an MPS. For binary symbol, the MPS and the LPS can be 0 or 1. For example, if the LPS is 1, the MPS is 0; and if the LPS is 0, the MPS is 1. The probability value is estimated for the corresponding context and can be used to entropy code the symbol using the arithmetic coder.

The arithmetic coding step of the CABAC based encoding process is based on the principle of recursive interval subdivision according to the probability model. In some examples, the arithmetic coding step is handled by a state machine with a range parameter and a low parameter. The state machine can change values of the range parameter and the low parameter based on the contexts (probability models) and a sequence of bins to code. The value of the range parameter indicates a size of a current range that the coded value (of bins) falls into, and the value of the low parameter indicates the lower boundary of the current range. In an example, according to a probability state (e.g., in association with a probability value), a current range (CurrRange) is divided into a first subrange (MpsRange) (also referred to as MPS range of the current state) and a second subrange (LpsRange) (also referred to as LPS range of the current state). In an example, the second subrange can be calculated by a multiplication, such as using Eq. (15)

$$LpsRange = CurrRange \times \rho \qquad \text{Eq. (15)}$$

where $\rho$ is the probability value that the current bin is the LPS. The probability that the current bin is MPS can be calculated by $(1-\rho)$. The first subrange can be calculated by Eq. (16):

$$MpsRange = CurrRange - LpsRange \qquad \text{Eq. (16)}$$

In an example, when the current bin is MPS, the value of the low parameter is kept, and the value of the range parameter is updated to MpsRange; and when the current bin is LPS, the value of the low parameter is updated to (low+MpsRange), and the value of the range parameter is updated to LpsRange. Then, the encoding process of CABAC can continue to a next bin in the sequence of bins.

In some examples (e.g., HEVC), the value of the range parameter is expressed with 9 bits and the value of the low parameter is expressed with 10 bits. Further, a renormalization process can be performed to maintain the range and low values at sufficient precision. For example, the renormalization can be performed whenever the value of the range parameter is less than 256. Therefore, the range parameter is equal or larger than 256 after renormalization.

In some examples (e.g., HEVC), 64 possible probability values for the LPS can be used and each MPS can be 0 or 1. In an example, the probability models can be stored as 7-bit entries that correspond to 64 probability values (64 probability states) and 2 possible values for MPS (0 or 1). In each of the 7-bit entries, 6 bits may be allocated for representing the probability state, and 1 bit may be allocated for the MPS.

In some examples, to reduce the computation of deriving LPS ranges (e.g., multiplications in Eq. (15)), results for all cases are pre-calculated, quantized and stored as approximations in a look-up table. Therefore, the LPS range can be obtained by using a table lookup without any multiplication operations. Avoiding multiplication can be important for some devices or applications, to reduce computation and latency.

FIG. 15 shows a table (1500) of quantized values of LPS ranges in some examples. In some examples, the range parameter is expressed with 9 bits, and the values of the range parameter are equal or greater than 256. The ranges can be divided into four segments, such as referred to as segment 0, segment 1, segment 2 and segment 3. The segment 0 includes 64 ranges with values from 256 to 319; the segment 1 includes 64 ranges with values from 320 to 383; the segment 2 includes 64 ranges with values from 384 to 447; the segment 3 includes 64 ranges with values from 448 to 511. The index of the segments can be derived using (range>>6)&3 in an example, where range denotes to the range parameter expressed with 9 bits. In some examples, the range parameter is expressed with 9 bits, then the quantized values of the LPS range can be expressed using 8 bits, thus values in the table (1500) can be expressed using 8 bits.

In the FIG. 15 example, the table (1500) includes 4 columns respectively corresponding the 4 segments of ranges and includes 64 rows respectively corresponding to 64 probability states (associated with respective probability values). A value stored at an entry with a row index and a column index is a quantized value for a LPS range in association with a probability state (corresponding to the row index) and a range segment (corresponding to the column index). In the FIG. 15 example, LPS ranges for a probability state are quantized into four values (i.e., one value for each segment).

In some examples, a CABAC engine for performing CABAC based encoding or decoding (e.g., in a video encoder or in a video decoder), can include the table (1500) that stores 64×4 8-bit values to approximate the calculations in Eq. (15). The table (1500) can be used for performing a table-based probability transition process between 64 different probability states. For example, for a current range, a probability state is determined. The current range is used to determine a range segment that indicates a column index in the table (1500). The probability state is used to determine a row index in the table (1500). Then, a table lookup is performed to the table (1500) to obtain a value stored in an entry having the row index and the column index, and the value is the approximated LPS range.

In some examples (e.g., VVC), the probability value of a probability state is linearly expressed by a probability index (denoted by pStateIdx), and calculation can be done with equations without LUT operation. To improve the accuracy of probability estimation, a multi-hypothesis probability update model can be applied. For example, the pStateIdx used in the interval subdivision in the binary arithmetic coder is a combination of two probabilities pStateIdx0 and pStateIdx1 (in the case of two hypotheses). The two probabilities are associated with respective context models and are updated independently with different adaptation rates. The adaptation rates of pStateIdx0 and pStateIdx1 for the respective context models can be pre-trained based on the statistics of the associated bins. In some examples, the probability estimate pStateIdx is an average of the estimates from the two hypotheses.

Figure 16:
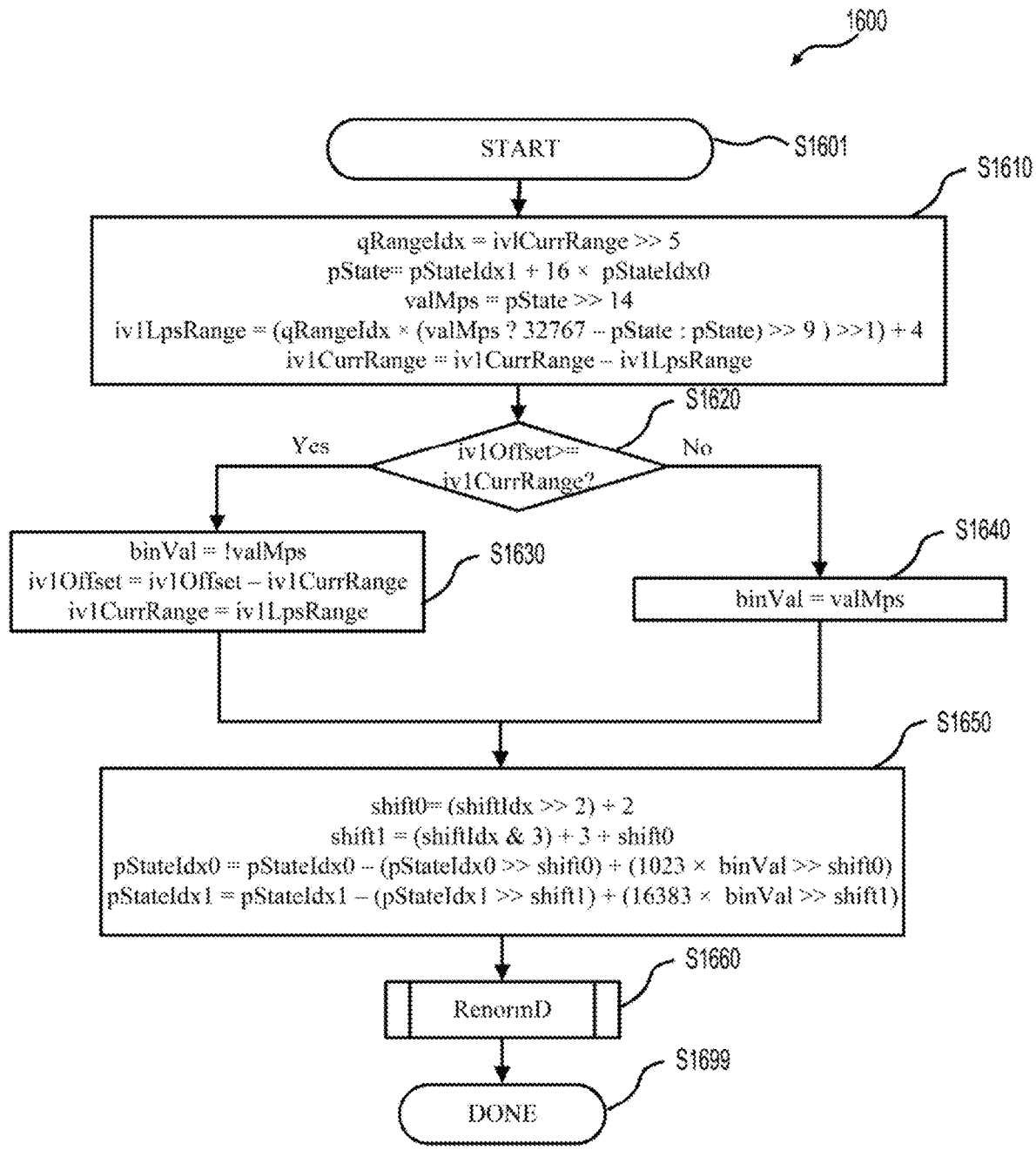
FIG. 16 shows a flowchart outlining a process for decoding in some examples.

FIG. 16 shows a flowchart outlining a process (1600) for decoding a single binary decision in some examples (e.g., VVC). In some examples, context table (e.g., denoted by a variable ctxTable), and context index (e.g., denoted by ctxIdx), can be provided to the process (1600) to obtain the probability state information, such as two probabilities pStateIdx0 and pStateIdx1. The process (1600) can operate on variables ivlCurrRange (indicative of the current range), and ivlOffset (indicative of the lower boundary of the current range) based on the probability state information, such as the two probabilities pStateIdx0 and pStateIdx1, and can output the decoded value binVal, and update the variables ivlCurrRange and ivlOffset, and the two probabilities pStateIdx0 and pStateIdx1. It is noted that, in some examples, the variables ivlCurrRange and ivlOffset are defined in certain way that ivlOffset is greater than or equal to ivlCurrRange. The process (1600) starts at (S1601), and proceeds to (S1610).

At (S1610), the value of the LPS range (denoted by a variable ivlLpsRange) is derived. In an example, given the current value of ivlCurrRange, a variable qRangeIdx is derived as Eq. (17):

$$qRangeIdx = ivlCurrRange \gg 5 \qquad \text{Eq. (17)}$$

Then, given qRangeIdx, pStateIdx0 and pStateIdx1 (associated with ctxTable and ctxIdx), the value of MPS (denoted by valMps) and the value of LPS range (denoted by ivlLpsRange) are derived, for example according to Eq. (18), Eq. (19) and Eq. (20):

$$pState = pStateIdx1 + 16 \times pStateIdx0 \qquad \text{Eq. (18)}$$

$$valMps = pState \gg 14 \qquad \text{Eq. (19)}$$

$$ivlLpsRange = \qquad \text{Eq. (20)}$$
$$(qRangeIdx \times ((valMps \; ? \; 32767 - pState : pState) \gg 9) \gg 1) + 4$$

Further, the bin is assumed to be MPS, then the variable ivlCurrRange is set equal to (ivlCurrRange−ivlLpsRange).

At (S1620), if the variable ivlOffset is greater than or equal to ivlCurrRange, the assumption (the bin is MPS) is not true, and the process proceeds to (S1630); otherwise, the process proceeds to (S1640).

At (S1630), the bin is LPS and thus the bin value (denoted by the variable binVal) is set equal to (1−valMps), the lower boundary of the current range and the current range are updated accordingly. In an example, the variable ivlOffset is decremented by ivlCurrRange, and ivlCurrRange is set equal to ivlLpsRange.

At (S1640), the bin is MPS, and the variable binVal is set equal to valMps.

At (S1650), state transition is performed. The probability state information, such as the two probabilities pStateIdx0 and pStateIdx1, is updated based on the decoded value binVal.

In some examples, two adaptation variables shift0 and shift1 are derived from the shiftIdx value that is associated with ctxTable and ctxIdx, such as shown by Eq. (21) and Eq. (22):

$$shift0 = (shiftIdx \gg 2) + 2 \qquad \text{Eq. (21)}$$

$$shift1 = (shiftIdx \; \& \; 3) + 3 + shift0 \qquad \text{Eq. (22)}$$

The probability state information, such as the two probabilities pStateIdx0 and pStateIdx1, is updated according to the decoded value binVal, such as shown by Eq. (23) and Eq. (24):

$$pStateIdx0 = \qquad \text{Eq. (23)}$$
$$pStateIdx0 - (pStateIdx0 \gg shift0) + (1023 \times binVal \gg shift0)$$

At (S1660), a renormalization step can be performed, for example, when the current range ivlCurrRange is less than 256. Then, the process (1600) proceeds to (S1699) and terminates.

According to an aspect of the disclosure, filter parameter search in some CCSO implementation is computationally expensive and contributes to a major share in the encoder complexity. The present disclosure provide techniques to perform certain pre-analysis that can also be used to reduce CCSO signaling overhead.

In the following description, CCSO is defined as a filtering process which uses the reconstructed samples of a first color component as input (e.g., Y or Cb or Cr), and the output is applied on a second color component which is a different color component of the first color component.

In the following description, the term block may be interpreted as a prediction block, a coding block, or a coding unit, i.e., CU. The term block may also be used to refer to the transform block. The term block here may also be used to refer to the CTU block or a CCSO super block (SB). The term filtering block or filtering unit may also be used to refer to the CTU block or a CCSO SB that is associated with a flag indicating whether CCSO filtering is applied on this block (or CCSO SB) or not.

In the following description, the terms CCSO parameter or filter parameter may also be used to refer to the CCSO filter parameters, examples of CCSO parameters include, but not limited to quantization step size, filter shape (or namely filter support), the number of filter taps, the number of bands (or band number), filtering unit size, and the like.

According to an aspect of the disclosure, features in an image refer to image textures that can gives information about the spatial arrangement of color or intensities in an image or selected region of an image. In the following description, image and/or block features include, but are not limited to edge directions, histogram, gradients, range of pixel values and so on. Edges are defined as significant difference or sudden changes in pixel values locally.

In the following description, the term value and index of the value may be used interchangeably. It is noted that CCSO can be applied on luma and/or chroma blocks.

According to some aspects of the disclosure, feature based context (e.g., context that is based on one or more features) is used for signaling CCSO filter parameters. The signaling refers to the condition whether a specific CCSO filter parameter is signaled, and/or the context used for entropy coding the CCSO filter parameter. In some examples, the signaling according to the feature based context indicates whether a specific CCSO filter parameter is signaled, and further the signaling according to the feature based context can be used for entropy coding the CCSO filter parameter. For example, an example decoder may determine one or more features associated with the one or more blocks, whereas the one or more features are used as a context for determining whether a respective filter parameter in the plurality of CCSO filter parameters is signaled in the coded video bitstream indicative of texture information in the one or more blocks. The decoder can further determine at least a signaled value associated with the CCSO filter based on a context model, the context model using the one or more features as a context. Then, the decoder can reconstruct samples in the one or more blocks based on at least the signaled value associated with the CCSO.

In one embodiment, features including but not limited to edge direction are used as context for signaling CCSO filter parameters, such as filter support (e.g., filter shapes).

In one example, if a picture contains vertical edges, higher context/probability is assigned to vertical and near-vertical filter shapes. Vertical edges in an image can be detected by vertical direction kernels. In other words, if a picture contains vertical edges, vertical direction kernel will yield higher magnitude response compared to other direction kernels.

In an example, a vertical direction kernel can be used to detect whether a picture or a block include vertical edges. When a picture or a block includes vertical edges, vertical or near vertical filter shapes, such as filter shape 1 in FIG. 14, can be assigned with higher probability than the horizontal filter shapes, such as the filter shape 3, filter shape 5 and filter shape 6 in FIG. 14.

Similarly, in an example, a horizontal direction kernel can be used to detect whether a picture or a block include horizontal edges. When a picture or a block includes horizontal edges, horizontal or near horizontal filter shapes, such as filter shapes 3, 5 and 6 in FIG. 14, can be assigned with higher probability than the vertical filter shapes, such as the filter shape 1 in FIG. 14.

In another example, if filter shapes are signaled for each CCSO SB separately and there are diagonal edges in a certain SB, diagonal and near diagonal filter shapes are assigned higher probability/context. Diagonal edges in an image can be detected by diagonal direction filter kernel. In other words, if a SB contains diagonal edges, diagonal direction filter kernel will yield higher magnitude response compared to other direction filter kernels.

In an example, a diagonal direction (filter) kernel can be used to detect whether a CCSO SB (e.g., a SB with CCSO being applied) includes one or more diagonal edges. When CCSO SB is detected including one or more diagonal edges, diagonal direction filter shapes, such as filter shape 2 or filter shape 4 in FIG. 14, can be assigned with higher probability than other filer shapes in FIG. 14.

In another embodiment, certain features including but not limited to range of pixel values, histogram are used as context for signaling band number and/or quantization step.

In one example, the range of pixel values in a picture or a block calculated as difference between maximum and minimum pixel value is used as context for signaling band number. For example, when the range of pixel values is relatively small, the smaller number of bands can be assigned with higher probability in a context model.

According to some aspects of the disclosure, an encoder can be configured to perform feature based fast encoder search of optimal CCSO filter parameters.

In one embodiment, features including but not limited to edge directions are used to skip checking certain filter shapes.

In one example, when a picture contains horizontal edges, encoder search for the vertical and/or near-vertical filter shapes may be skipped. Horizontal edges in an image can be detected by horizontal direction filter kernels. In other words, when a picture contains horizontal edges, horizontal direction filter kernel can yield higher magnitude response compared to other direction filter kernels.

In another embodiment, certain features including but not limited to range of pixel values, histogram are used to skip checking certain band numbers and/or quantization steps.

In one example, if the difference between maximum and minimum pixel value in a CCSO SB is very low i.e., the SB contains very narrow range of pixel values, encoder search for band numbers which fall outside the range of pixel values in the SB may be skipped.

In an example, when the range of pixel values in the SB is in the middle of a range for all bands, the encoder search for side bands (e.g., lower bands and upper bands) can be skipped, and encoder can perform encoder search for center bands. In another example, when the range of pixel values in the SB is in the lower portion of a range for all bands, the encoder search for center bands and upper bands can be skipped, and encoder can perform the encoder search for the lower bands. In another example, when the range of pixel values in the SB is in the upper portion of a range for all bands, the encoder search for center bands and lower bands can be skipped, and encoder can perform the encoder search for the upper bands.

According to some aspects of the disclosure, feature based fast CCSO frame-level/tile-level/block-level on/off decision and contexts for signaling the decision can be performed.

In one embodiment, if a certain picture, tile and/or block is flat i.e., does not contain edges or substantial pixel value variations, CCSO is disabled by default for that picture, tile and/or block without any encoder search. According to an aspect of the disclosure, CCSO can improve image coding quality for images with edges and substantial pixel value variations. Thus, when a picture, tile or block has a flat feature (e.g., no edges, no substantial pixel value variations), CCSO may have little contribution to image coding quality but can increase computation complexity, disabling CCSO can reduce computation complexity.

In one example, the range of pixel values in a picture (or tile or block) is used as a feature for fast CCSO on/off decision. In other words, if the difference between the minimum and maximum pixel values in a picture (or tile or block) is less than a certain threshold (thr1), CCSO is disabled for that picture (or tile or block) without any encoder search. Example values of thr1 include but not limited to a value greater than or equal to 1. In some examples, the difference between the minimum and maximum pixel values in a picture (or tile or block) being equal or more than the threshold (thr1) is one of multiple conditions to enable CCSO for that picture (or tile or block).

In another example, the sum of absolute values in a block filtered using Prewitt or Sobel kernel is used as a feature. If the sum of absolute values is less than a threshold (thr2), CCSO is disabled for the block without any encoder search. Example values of thr2 include but not limited to a value greater than or equal to 1. In some examples, the sum of absolute values being more than the threshold (thr2) is one of multiple conditions to enable CCSO for the block.

Specifically, Prewitt kernel and Sobel kernel are generally used to detect edges. When a block has edges, the Prewitt kernel or Sobel kernel can yield higher magnitude response. When the sum of absolute values in a block filtered using Prewitt kernel or Sobel kernel is less than the threshold (thr2), the block can be determined to lack edges, and is relatively flat, and CCSO can be disabled for the block without any encoder search to reduce computation complexity.

In one embodiment, if picture-level pre-analysis method (examples of pre-analysis method includes but not limited to edge detection, range of pixel values) shows that certain regions of the picture are flat i.e., does not contain edges or substantial pixel value variations, CCSO is disabled by default for the SBs in such regions without encoder search. In some examples, the picture level pre-analysis showing a region in the picture not being flat is one of multiple conditions to enable CCSO for SBs in the region.

In one embodiment, if the picture-level, tile-level and/or block-level features indicate that the given picture and/or the block is flat i.e., does not contain edges or substantial pixel value variations, higher probability (context) is assigned for signaling CCSO off decision.

In one embodiment, features of spatially neighboring blocks indicating the flatness or presence of edges in the neighboring block may also be used as context for signaling the block-level CCSO on/off decision.

In one embodiment, features include but not limited to coded syntax values, such as whether skip mode is applied, whether intra or inter prediction mode is applied, whether residuals are zero or not, the intra prediction mode direction, the coding block partitioning size.

In one example, the coding block partitioning size is used to decide whether CCSO can be applied and signaled. In an example, when a picture has edges and textures, the coding block partitioning size for the block is small. Thus, when the coding block partitioning size is small, CCSO may improve image coding quality; and when the coding block partitioning size is large, CCSO may not be useful regarding image coding quality, and CCSO can be disabled.

In one example, the skip mode flag, or coding block partitioning size is used to decide whether CCSO can be applied and signaled. For example, when the skip mode flag indicates that skip mode is used for the coding block, then the current picture is very close to reference picture, CCSO may not be useful regarding image coding quality, and CCSO can be disabled.

In one example, whether DC, SMOOTH, SMOOTH-H, SMOOTH-V modes are applied is used to decide whether CCSO can be applied and signaled. In some examples, certain intra prediction mode, such as DC mode, SMOOTH mode, SMOOTH-H mode and SMOOTH-V mode, is used for block prediction when the block has a smooth gradient within the block. Thus, when DC mode, SMOOTH mode, SMOOTH-H mode or SMOOTH-V mode is used for prediction of a block, the block has relatively smooth gradient with the block, then CCSO may not be useful regarding image coding quality, and CCSO can be disabled.

Figure 17:
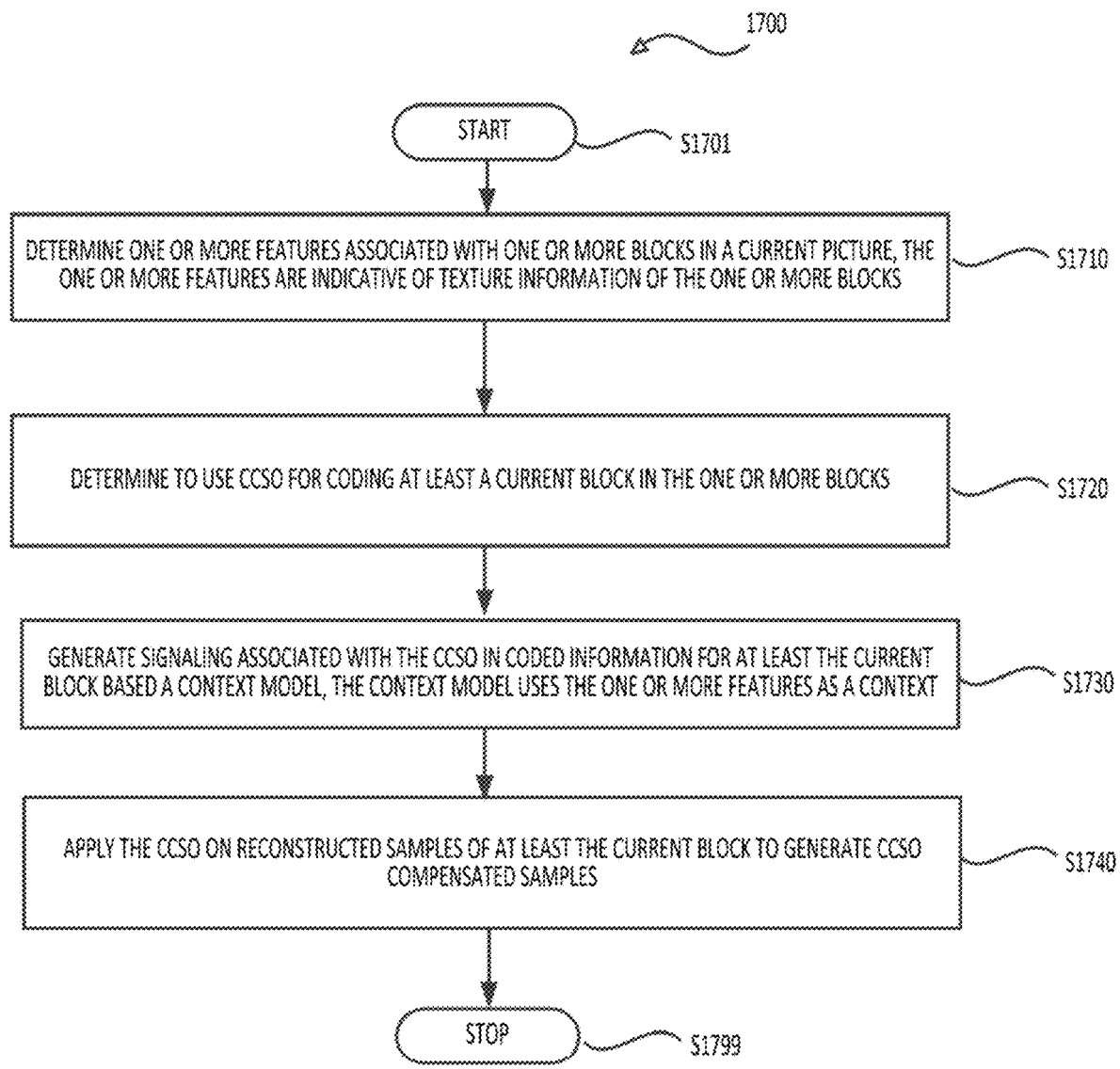
FIG. 17 shows a flow chart outlining a process according to some embodiment of the disclosure.

FIG. 17 shows a flow chart outlining a process (1700) according to an embodiment of the disclosure. The process (1700) can be used in a video encoder. In various embodiments, the process (1700) is executed by processing circuitry, such as the processing circuitry that performs functions of the video encoder (103), the processing circuitry that performs functions of the video encoder (303), and the like. In some embodiments, the process (1700) is implemented in software instructions, thus when the processing circuitry executes the software instructions, the processing circuitry performs the process (1700). The process starts at (S1701) and proceeds to (S1710).

At (S1710), one or more features associated with one or more blocks in a current picture are determined, the one or more features are indicative of texture information of the one or more blocks.

At (S1720), to use cross-component sample offset (CCSO) (also referred to as CCSO filter) for coding at least a current block in the one or more blocks is determined.

At (S1730), signaling associated with the CCSO is generated in coded information for at least the current block based a context model, the context model uses the one or more features as a context. According to some aspects of the disclosure, feature based context can be used for signaling CCSO filter parameters. The signaling refers to the condition whether a specific CCSO filter parameter is signaled, and/or the context used for entropy coding the CCSO filter parameter.

At (S1740), the CCSO is applied on reconstructed samples of at least the current block to generate CCSO compensated samples.

In one embodiment, features including but not limited to edge direction are used as context for signaling CCSO filter parameters, such as filter support (e.g., filter shapes). In some examples, the one or more features include at least one of an edge direction for one or more edges in the one or more blocks, a range of pixel values in the one or more blocks, a histogram of pixel values in the one or more blocks, and gradient information of pixels in the one or more blocks.

In some examples, the context model includes an assignment of probability values to candidate values of a filter parameter for the CCSO, the assignment is based on the one or more features. For example, the one or more features includes an edge direction, the signaling is indicative of a filter shape.

In one example, if a picture contains vertical edges, higher context/probability is assigned to vertical and near-vertical filter shapes. Vertical edges in an image can be detected by vertical direction kernels. In other words, if a picture contains vertical edges, vertical direction kernel will yield higher magnitude response compared to other direction kernels.

In another example, if filter shapes are signaled for each CCSO SB separately and there are diagonal edges in a certain SB, diagonal and near diagonal filter shapes are assigned higher probability/context. Diagonal edges in an image can be detected by diagonal direction filter kernel. In other words, if a SB contains diagonal edges, diagonal direction filter kernel will yield higher magnitude response compared to other direction filter kernels. Specifically, in an example, in response to the edge direction being vertical, the context model includes a highest probability assigned to a vertical filter shape. In another example, in response to the edge direction being horizontal, the context model includes a highest probability assigned to a horizontal filter shape. In another example, in response to the edge direction being diagonal, the context model includes a highest probability assigned to a diagonal filter shape.

In another embodiment, certain features including but not limited to range of pixel values, histogram are used as context for signaling band number and/or quantization step. In one example, the range of pixel values in a picture or a block calculated as difference between maximum and minimum pixel value is used as context for signaling band number. Specifically, in an example, the one or more features include a range of pixel values in the one or more blocks, and the context model includes an assignment of probability values to candidate band numbers. In another example, the one or more features include a range of pixel values in the one or more blocks, and the context model includes an assignment of probability values to candidate quantization steps.

According to some aspects of the disclosure, an encoder can be configured to perform feature based fast encoder search of optimal CCSO filter parameters. Specifically, a search of CCSO filter parameters can be performed based on the one or more features. The search can include evaluation of rate distortion cost for combinations of values of CCSO filter parameters.

In one embodiment, features including but not limited to edge directions are used to skip checking certain filter shapes. In one example, when a picture contains horizontal edges, encoder search for the vertical and/or near-vertical filter shapes may be skipped. Horizontal edges in an image can be detected by horizontal direction filter kernels. In other words, when a picture contains horizontal edges, horizontal direction filter kernel can yield higher magnitude response compared to other direction filter kernels. Specifically, in some examples, the one or more features include an edge direction, the search of CCSO filter parameters can skip evaluation of at least a filter shape (e.g., having a direction significant different from the edge direction) in the search of CCSO filter parameters based on the edge direction. For example, when the edge direction is vertical, then evaluation of horizontal filter shape can be skipped. When the edge direction is horizontal, then evaluation of vertical filter shape can be skipped.

In another embodiment, certain features including but not limited to range of pixel values, histogram are used to skip checking certain band numbers and/or quantization steps. In one example, if the difference between maximum and minimum pixel value in a CCSO SB is very low i.e., the SB contains very narrow range of pixel values, encoder search for band numbers which fall outside the range of pixel values in the SB may be skipped. Specifically, in some examples, the one or more features include a range of pixel values or histogram of pixel values, evaluation of certain band numbers can be skipped in the search of CCSO filter parameters based on the range of pixel values or the histogram of pixel values. In an example, when the range of pixel values in a SB is small, then evaluation of band numbers that are out of the range of pixel values can be skipped.

According to some aspects of the disclosure, feature based fast CCSO frame-level/tile-level/block-level on/off decision and contexts for signaling the decision can be performed. In one embodiment, if a certain picture, tile and/or block is flat i.e., does not contain edges or substantial pixel value variations, CCSO is disabled by default for that picture, tile and/or block without any encoder search.

In some examples, an on/off decision of CCSO of at least one of a frame level, a block level, and a tile level is made based on the one or more features.

In one example, the range of pixel values in a picture (or tile or block) is used as a feature for fast CCSO on/off decision. In other words, if the difference between the minimum and maximum pixel values in a picture (or tile or block) is less than a certain threshold (thr1), CCSO is disabled for that picture (or tile or block) without any encoder search. Example values of thr1 include but not limited to a value greater than or equal to 1.

Specifically, in some examples, the one or more features are indicative of the one or more blocks being flat, the CCSO is disabled for the one or more blocks in response to the flatness without a search of the CCSO filter parameters.

In another example, the sum of absolute values in a block filtered using Prewitt or Sobel kernel is used as a feature. If the sum of absolute values is less than a threshold (thr2), CCSO is disabled for the block without any encoder search. Example values of thr2 include but not limited to a value greater than or equal to 1. In some examples, the sum of absolute values being more than the threshold (thr2) is one of multiple conditions to enable CCSO for the block.

Specifically, in an example, the one or more features include a range of pixel values, the CCSO is disabled without a search of CCSO filter parameters for the one or more blocks in response to the range of pixel values is less than a threshold. In another example, the one or more features include a sum of absolute values using a Prewitt kernel or a Sobel kernel, the CCSO is disabled without a search of CCSO filter parameters for the one or more blocks in response to the sum of the absolute values is less than a threshold.

In one embodiment, if picture-level pre-analysis method (examples of pre-analysis method includes but not limited to edge detection, range of pixel values) shows that certain regions of the picture are flat i.e., does not contain edges or substantial pixel value variations, CCSO is disabled by default for the SBs in such regions without encoder search. Specifically, in some examples, a picture level pre-analysis that identifies a region in the current picture being flat is performed, then the CCSO for one or more super blocks in the region is disabled without a search of CCSO filter parameters for the one or more super blocks.

In one embodiment, if the picture-level, tile-level and/or block-level features indicate that the given picture and/or the block is flat i.e., does not contain edges or substantial pixel value variations, higher probability (context) is assigned for signaling CCSO off decision.

Specifically, in some examples, the signaling indicative of an on/off decision for the CCSO is determined based on the context model that uses the one or more features as the context. The on/off decision is of at least one of a frame level, a tile level, and a block level.

In some examples, the one or more features is indicative a flatness, and the context model includes an assignment of a higher probability value to a first candidate value corresponding to an off decision for the CCSO, and of a lower probability value to a second candidate value corresponding to an on decision for the CCSO.

In one embodiment, features of spatially neighboring blocks indicating the flatness or presence of edges in the neighboring block may also be used as context for signaling the block-level CCSO on/off decision. Specifically, in some examples, the one or more blocks includes a current block and a neighboring block of the current block, the context model uses a flatness of the neighboring block as context.

In one embodiment, features include but not limited to coded syntax values, such as whether skip mode is applied, whether intra or inter prediction mode is applied, whether residuals are zero or not, the intra prediction mode direction, the coding block partitioning size.

In one example, the coding block partitioning size is used to decide whether CCSO can be applied and signaled. In one example, the skip mode flag, or coding block partitioning size is used to decide whether CCSO can be applied and signaled. In one example, whether DC, SMOOTH, SMOOTH-H, SMOOTH-V modes are applied is used to decide whether CCSO can be applied and signaled.

Specifically, in some examples, the one or more features include at least one of a first coded syntax value indicative of whether a skip mode being applied, a second coded syntax value indicative of whether intra or inter prediction mode being applied, a third coded syntax value indicative of whether residuals being zero or not, a fourth coded syntax value indicative of an intra prediction mode direction, and a fifth coded syntax value indicative of a coding block partitioning size.

Then, the process proceeds to (S1799) and terminates.

The process (1700) can be suitably adapted. Step(s) in the process (1700) can be modified and/or omitted. Additional step(s) can be added. Any suitable order of implementation can be used.

Figure 18:
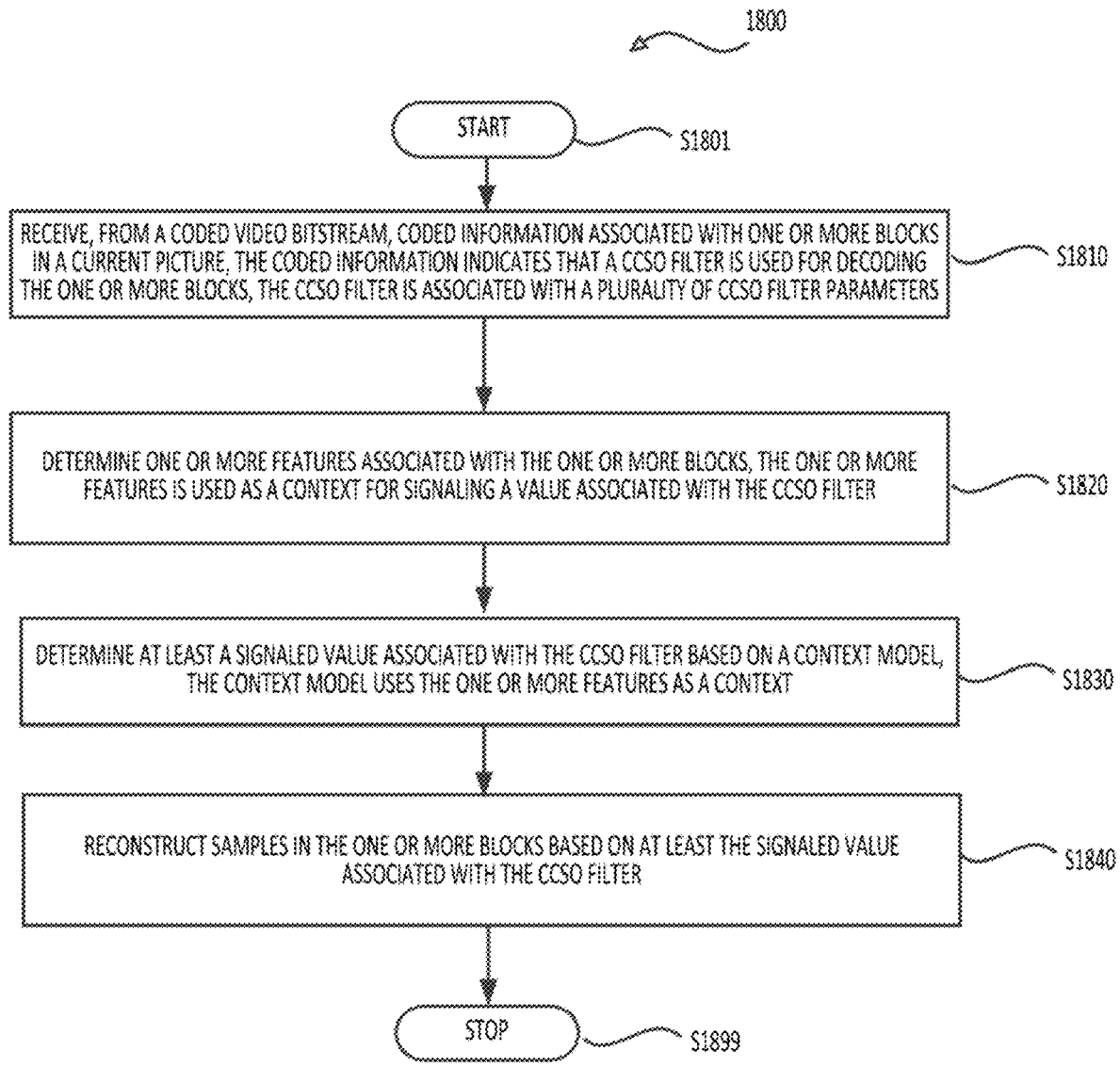
FIG. 18 shows a flow chart outlining another process according to some embodiment of the disclosure.

FIG. 18 shows a flow chart outlining a process (1800) according to an embodiment of the disclosure. The process (1800) can be used in a video decoder. In various embodiments, the process (1800) is executed by processing circuitry, such as the processing circuitry that performs functions of the video decoder (110), the processing circuitry that performs functions of the video decoder (210), and the like. In some embodiments, the process (1800) is implemented in software instructions, thus when the processing circuitry executes the software instructions, the processing circuitry performs the process (1800). The process starts at (S1801) and proceeds to (S1810).

At (S1810), from a coded video bitstream, coded information associated with one or more blocks in a current picture is received. The coded information indicates that a cross-component sample offset (CCSO) filter is used for decoding the one or more blocks, the CCSO filter is associated with a plurality of CCSO filter parameters.

At (S1820), one or more features associated with the one or more blocks are determined. The one or more features are used as a context for signaling a value associated with the CCSO filter.

At (S1830), at least a signaled value associated with the CCSO filter is determined based on a context model, the context model uses the one or more features as a context.

At (S1840), samples in the one or more blocks are reconstructed based on at least the signaled value associated with the CCSO filter.

In some examples, the context for signaling the value associated with the CCSO filter includes at least one of whether a specific CCSO filter parameter is signaled, and/or the context used for entropy coding the specific CCSO filter parameter.

In some examples, the one or more features is indicative of texture information in the one or more blocks, the one or more features includes at least one of an edge direction for one or more edges in the one or more blocks, a range of pixel values in the one or more blocks, a histogram of pixel values in the one or more blocks, and gradient information of pixels in the one or more blocks.

In some examples, the context model is determined based on the one or more features, the context model comprises an assignment of at least a first probability value to a first candidate value of a filter parameter for the CCSO filter and a second probability value to a second candidate value of the filter parameter for the CCSO filter, the first probability value is higher than the second probability value when the first candidate value is associated with the one or more features.

In some examples, based on the context model, it is determined that a specific filter parameter for the CCSO filter is not signaled.

In one embodiment, features including but not limited to edge direction are used as context for signaling CCSO filter parameters, such as filter support (e.g., filter shapes). In some examples, the one or more features comprises at least one of an edge direction for one or more edges in the one or more blocks, a range of pixel values in the one or more blocks, a histogram of pixel values in the one or more blocks and gradient information of pixels in the one or more blocks.

In some examples, the context model is selected from a plurality of candidate context models based on the one or more features, the context model includes an assignment of probability values to candidate values of a filter parameter for the CCSO filter.

In one example, if a picture contains vertical edges, higher context/probability is assigned to vertical and near-vertical filter shapes. Vertical edges in an image can be detected by vertical direction kernels. In other words, if a picture contains vertical edges, vertical direction kernel will yield higher magnitude response compared to other direction kernels.

In another example, if filter shapes are signaled for each CCSO SB separately and there are diagonal edges in a certain SB, diagonal and near diagonal filter shapes are assigned higher probability/context. Diagonal edges in an image can be detected by diagonal direction filter kernel. In other words, if a SB contains diagonal edges, diagonal direction filter kernel will yield higher magnitude response compared to other direction filter kernels.

Specifically, in some examples, the one or more features include an edge direction, the signaled value is indicative of a filter shape. In an example, in response to the edge direction being vertical, the context model is determined to have a highest probability assigned to a vertical filter shape. In another example, in response to the edge direction being horizontal, the context model is determined to have a highest probability assigned to a horizontal filter shape. In another example, in response to the edge direction being diagonal, the context model is determined to have a highest probability assigned to a diagonal filter shape.

In another embodiment, certain features including but not limited to range of pixel values, histogram are used as context for signaling band number and/or quantization step. In one example, the range of pixel values in a picture or a block calculated as difference between maximum and minimum pixel value is used as context for signaling band number.

Specifically, in an example, the one or more features include a range of pixel values in the one or more blocks, and the context model include an assignment of probability values to candidate band numbers. In another example, the one or more features include a range of pixel values in the one or more blocks, and the context model includes an assignment of probability values to candidate quantization steps.

In one embodiment, if the picture-level, tile-level and/or block-level features indicate that the given picture and/or the block is flat i.e., does not contain edges or substantial pixel value variations, higher probability (context) is assigned for signaling CCSO off decision. Specifically, in an example, the signaled value indicative of an on/off decision for the CCSO is determined based on the context model that uses the one or more features as the context. The on/off decision is of at least one of a frame level, a tile level, and a block level.

In some examples, the one or more features is indicative of the one or more blocks being flat, and the context model includes an assignment of a higher probability value to a first candidate value corresponding to an off decision for the CCSO filter, and a lower probability value to a second candidate value corresponding to an on decision for the CCSO filter.

In one embodiment, features of spatially neighboring blocks indicating the flatness or presence of edges in the neighboring block may also be used as context for signaling the block-level CCSO on/off decision. Specifically, in some examples, the one or more blocks includes a current block and a neighboring block of the current block, and the context model uses a flatness of the neighboring block as context for making the on/off decision for the CCSO filter on the current block.

In one example, the coding block partitioning size is used to decide whether CCSO can be applied and signaled. In one example, the skip mode flag, or coding block partitioning size is used to decide whether CCSO can be applied and signaled. In one example, whether DC, SMOOTH, SMOOTH-H, SMOOTH-V modes are applied is used to decide whether CCSO can be applied and signaled. Specifically, in some examples, the one or more features include at least one of a first coded syntax value indicative of whether a skip mode being applied, a second coded syntax value indicative of whether intra or inter prediction mode being applied, a third coded syntax value indicative of whether residuals being zero or not, a fourth coded syntax value indicative of an intra prediction mode direction, and a fifth coded syntax value indicative of a coding block partitioning size.

Then, the process proceeds to (S1899) and terminates.

The process (1800) can be suitably adapted. Step(s) in the process (1800) can be modified and/or omitted. Additional step(s) can be added. Any suitable order of implementation can be used.

The techniques described above, can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
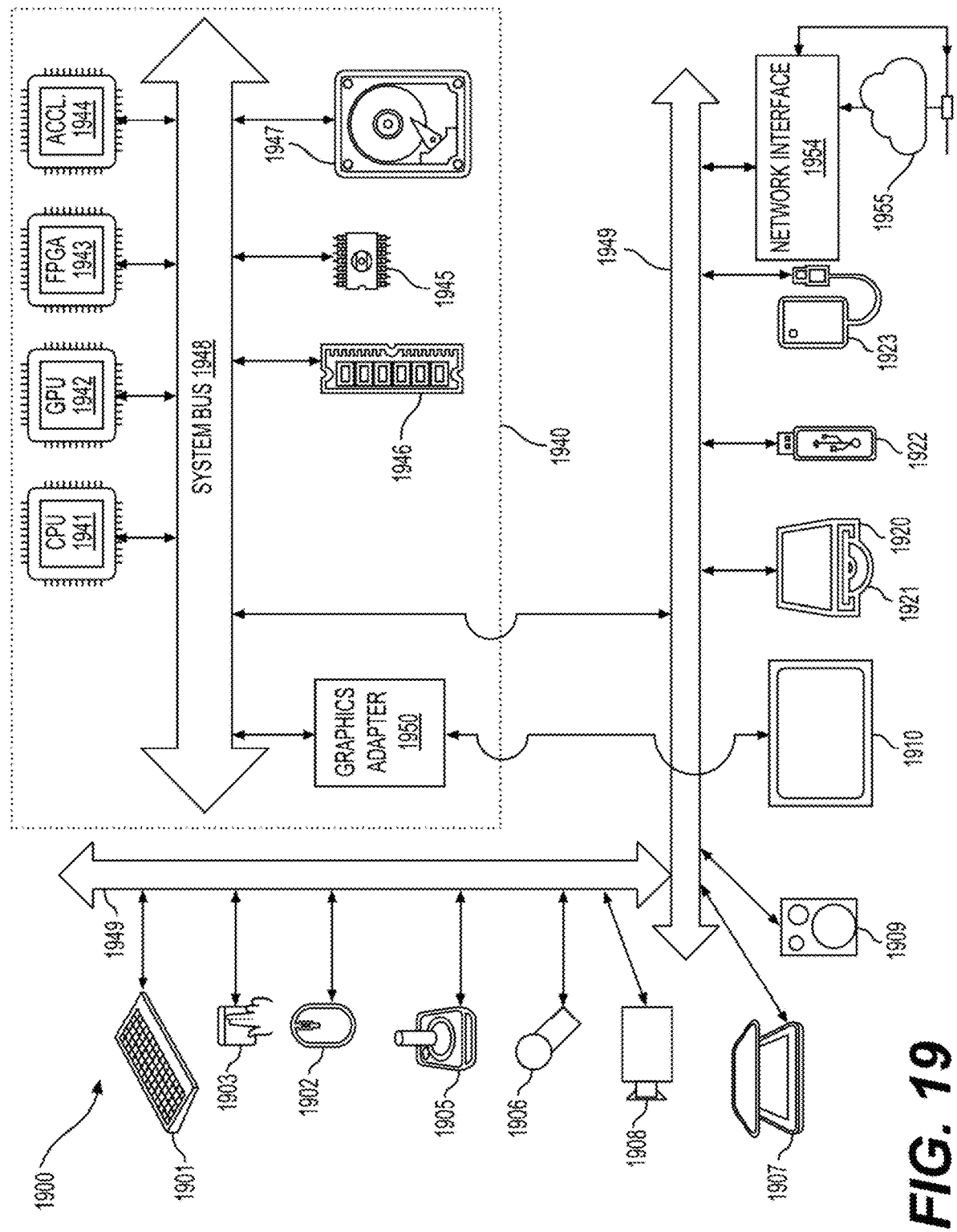
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface (1954) to one or more communication networks (1955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), graphics adapters (1950), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). In an example, the screen (1910) can be connected to the graphics adapter (1950). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1900), and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing in a decoder, comprising:
   receiving, from a coded video bitstream, coded information associated with one or more blocks in a current picture, the coded information indicating that a cross-component sample offset (CCSO) filter is used for decoding the one or more blocks, the CCSO filter being associated with a plurality of CCSO filter parameters;
   determining one or more features associated with the one or more blocks, the one or more features being used as a context for signaling a value associated with the CCSO filter;
   determining, based on the one or more features, a context model that is used for signaling the value of at least a parameter of the CCSO filter in the plurality of CCSO filter parameters, the context model including different probability values associated with candidate values of the parameter of the CCSO filter with the one or more features being used as the context;
   determining at least a signaled value associated with the CCSO filter based on the context model; and
   reconstructing samples in the one or more blocks based on at least the signaled value associated with the CCSO filter.

2. The method of claim 1, wherein the context for signaling the value associated with the CCSO filter comprises at least one of whether a specific CCSO filter parameter is signaled, and/or the context used for entropy coding the specific CCSO filter parameter.

3. The method of claim 1, wherein the one or more features is indicative of texture information in the one or more blocks, the one or more features comprises at least one of
   an edge direction for one or more edges in the one or more blocks;
   a range of pixel values in the one or more blocks;
   a histogram of pixel values in the one or more blocks; and
   gradient information of pixels in the one or more blocks.

4. The method of claim 1, further comprising:
   determining the context model based on the one or more features, the context model comprising an assignment of at least a first probability value to a first candidate value of a filter parameter for the CCSO filter and a second probability value to a second candidate value of the filter parameter for the CCSO filter, the first probability value being higher than the second probability value when the first candidate value is associated with the one or more features.

5. The method of claim 4, further comprising:
   determining, based on the context model, a specific filter parameter for the CCSO filter is not signaled.

6. The method of claim 4, wherein the one or more features comprise an edge direction, the signaled value is indicative of a filter shape, and the determining the context model further comprises at least one of:
   when the edge direction is vertical, determining the context model that comprises a highest probability assigned to a vertical filter shape;
   when the edge direction is horizontal, determining the context model that comprises a highest probability assigned to a horizontal filter shape; or
   when the edge direction is diagonal, determining the context model that comprises a highest probability assigned to a diagonal filter shape.

7. The method of claim 4, wherein the one or more features comprise a range of pixel values in the one or more blocks, and the context model comprises an assignment of probability values to candidate band numbers.

8. The method of claim 4, wherein the one or more features comprise a range of pixel values in the one or more blocks, and the context model comprises an assignment of probability values to candidate quantization steps.

9. The method of claim 1, wherein the determining at least the signaled value associated with the CCSO filter based the context model further comprises:
determining the signaled value indicative of an on/off decision for the CCSO filter based on the context model that uses the one or more features as the context.

10. The method of claim 9, wherein the on/off decision is of at least one of a frame level, a tile level, and a block level.

11. The method of claim 9, wherein the one or more features is indicative of a flatness, and the context model comprises an assignment of a higher probability value to a first candidate value of an off decision for the CCSO filter than to a second candidate value of an on decision for the CCSO filter.

12. The method of claim 9, wherein the one or more blocks comprises a current block and a neighboring block of the current block, and the context model uses a flatness of the neighboring block as context.

13. The method of claim 9, wherein the one or more features comprise at least one of a first coded syntax value indicative of whether a skip mode being applied, a second coded syntax value indicative of whether intra or inter prediction mode being applied, a third coded syntax value indicative of whether residuals being zero or not, a fourth coded syntax value indicative of an intra prediction mode direction, and a fifth coded syntax value indicative of a coding block partitioning size.

14. A method of video processing in an encoder, comprising:
determining one or more features associated with one or more blocks in a current picture;
determining to use a cross-component sample offset (CCSO) filter having a plurality of CCSO filter parameters for coding the one or more blocks;
determining at least a value of a parameter of the CCSO filter by skipping a check of at least a candidate value of the parameter based on the one or more features;
determining, based on the one or more features, a context model for signaling the value of the parameter, the context model including different probability values associated with candidate values of the parameter with the one or more features being used as a context; and
generating coded information of the one or more blocks based on the context model, the coded information indicating the value of the parameter associated with the CCSO filter according to the context model.

15. The method of claim 14, wherein the context for signaling the value associated with the CCSO filter comprises at least one of whether a specific CCSO filter parameter is signaled, and/or the context used for entropy coding the specific CCSO filter parameter.

16. The method of claim 14, wherein the one or more features is indicative of texture information in the one or more blocks, the one or more features comprises at least one of:
an edge direction for one or more edges in the one or more blocks;
a range of pixel values in the one or more blocks;
a histogram of pixel values in the one or more blocks; and
gradient information of pixels in the one or more blocks.

17. The method of claim 14, wherein the determining the context model comprises:
determining the context model based on the one or more features, the context model comprising an assignment of at least a first probability value to a first candidate value of a filter parameter for the CCSO filter and a second probability value to a second candidate value of the filter parameter for the CCSO filter, the first probability value being higher than the second probability value when the first candidate value is associated with the one or more features.

18. The method of claim 17, further comprising:
determining, based on the context model, not to signal a specific filter parameter for the CCSO filter.

19. The method of claim 17, wherein the one or more features comprise an edge direction, the value is indicative of a filter shape, and the determining the context model further comprises at least one of:
when the edge direction is vertical, determining the context model that comprises a highest probability assigned to a vertical filter shape;
when the edge direction is horizontal, determining the context model that comprises a highest probability assigned to a horizontal filter shape; or
when the edge direction is diagonal, determining the context model that comprises a highest probability assigned to a diagonal filter shape.

20. A method of processing visual media data, the method comprising:
processing a bitstream that includes the visual media data according to a format rule, wherein
the bitstream carries a plurality of pictures; and
the format rule specifies that:
coded information associated with one or more blocks in a current picture indicates that a cross-component sample offset (CCSO) filter is used for coding the one or more blocks, the CCSO filter being associated with a plurality of CCSO filter parameters;
one or more features associated with the one or more blocks are determined, the one or more features being used as a context for signaling a value associated with the CCSO filter;
a context model for signaling the value of at least a parameter of the CCSO filter in the plurality of CCSO filter parameters is determined based on the one or more features, the context model including different probability values associated with candidate values of the parameter of the CCSO filter with the one or more features being used as the context;
at least a signaled value associated with the CCSO filter is determined based on the context model; and
samples in the one or more blocks are reconstructed based on at least the signaled value associated with the CCSO filter.

* * * * *